United States Patent
Ouchi et al.

(10) Patent No.: US 8,630,104 B2
(45) Date of Patent: Jan. 14, 2014

(54) SWITCHING POWER SUPPLY AND DISPLAY DEVICE PROVIDED THE SAME

(75) Inventors: Takayuki Ouchi, Hitachi (JP); Minoru Moteki, Yokohama (JP); Akihiko Kanouda, Hitachinaka (JP)

(73) Assignee: TKR Corporation, Tokyo (JP)

( * ) Notice: Subject to any disclaimer, the term of this patent is extended or adjusted under 35 U.S.C. 154(b) by 321 days.

(21) Appl. No.: 13/217,309

(22) Filed: Aug. 25, 2011

(65) Prior Publication Data

US 2012/0146986 A1 Jun. 14, 2012

(30) Foreign Application Priority Data

Dec. 10, 2010 (JP) .................................. 2010-275527

(51) Int. Cl.
*H02M 1/36* (2007.01)
(52) U.S. Cl.
USPC .............................. 363/56.1; 363/40; 323/908
(58) Field of Classification Search
USPC ........ 363/20–21.18, 39, 40, 55, 56.09–56.12; 323/908
See application file for complete search history.

(56) References Cited

U.S. PATENT DOCUMENTS

| | | | |
|---|---|---|---|
| 4,870,554 A * | 9/1989 | Smith | 363/20 |
| 6,862,197 B2 * | 3/2005 | Eriksson | 363/21.04 |
| 6,947,296 B2 * | 9/2005 | Hirosawa | 363/20 |
| 6,947,297 B2 * | 9/2005 | Ke et al. | 363/20 |
| 2011/0266969 A1 * | 11/2011 | Ludorf | 315/294 |

FOREIGN PATENT DOCUMENTS

| | | |
|---|---|---|
| JP | 2004-194408 | 7/2004 |
| JP | 2004-320970 | 11/2004 |
| JP | 2008-306927 | 12/2008 |
| JP | 2010-178521 | 8/2010 |

OTHER PUBLICATIONS

Office Action in Japanese Patent Appln. 2010-275527, mailed Apr. 16, 2013 (in Japanese, 3 pgs).
Endo, Hiroaki, et al; 'A Study on Single-Stage Active Clamped PFC Converters', (in Japanese) [pp. 7-12], Technical Report of IEICE, EE2002-83 (Feb. 2003).

* cited by examiner

*Primary Examiner* — Jessica Han
(74) *Attorney, Agent, or Firm* — Antonelli, Terry, Stout & Kraus, LLP.

(57) ABSTRACT

A switching power supply has a function of improving a power factor, and outputs insulated DC. The switching power supply performs two kinds of controls for switching devices exclusive to each other: controlling of a switching device provided in a direction in which the discharging of a primary-side smoothing capacitor is prohibited at the time of suspension of commercially available AC power and near the zero cross of an input voltage; and causing a switching device provided between the output side of a third winding and the primary-side smoothing capacitor to control a charging current, thereby charging a capacitor in a boosted manner.

8 Claims, 16 Drawing Sheets

Q1 ON

Q1 TURN OFF

Q2 ON, Q4 ON

Q2 TURN OFF, Q4 OFF

Q1 ON, Q3 ON

Q1 TURN OFF, Q3 OFF

Q2 ON

Q2 TURN OFF

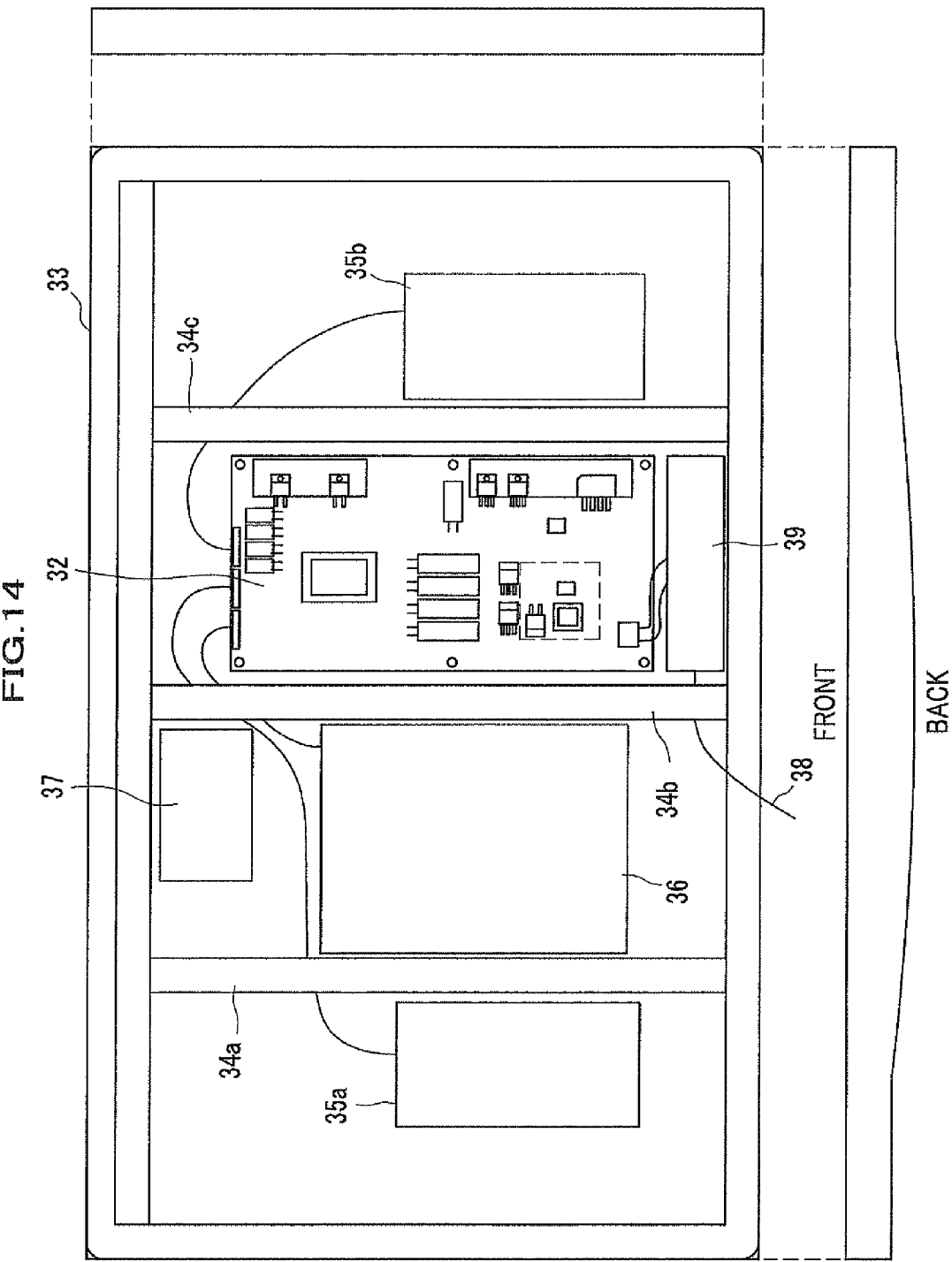

SWITCHING POWER SUPPLY AND DISPLAY DEVICE PROVIDED THE SAME

CROSS REFERENCE TO RELATED APPLICATION

This application claims priority under 35 U.S.C. §119 to Japanese Patent Application No. 2010-275527 filed on Dec. 10, 2010, the disclosure of which is incorporated herein by reference.

BACKGROUND OF THE INVENTION

1. Field of the Invention

The present invention relates to a switching power supply, and more specifically, a switching power supply which obtains a DC output power from an AC input power and which has a function of improving the power factor of an AC input current.

2. Description of the Related Art

In order to obtain a DC power from a commercially available power source (an AC power) through rectification and smoothing, a configuration of using a diode bridge and a smoothing capacitor is the simplest configuration. According to this configuration, however, the circuit configuration becomes a so-called capacitor-input type rectification circuit which has an input current allowed to flow only near the peak of a power-supply voltage. Accordingly, the power factor is reduced and the input harmonic increases, so that the problem of the input harmonic is regulated by an international standard. In order to clear such a standard, a converter is proposed which is called a PFC (Power Factor Correction) converter or a high power factor converter.

Among such converters, the most common circuit configuration is a so-called boosting PFC converter. Such a converter has a series circuit of a coil and a switch connected between the positive side and the negative side of a diode bridge that rectifies an AC current, the anode of a booster diode is connected to a contact between the coil and the switch, the cathode of the booster diode is connected to the high-voltage side of an output smoothing capacitor, and the low-voltage side of the output smoothing capacitor is connected to the negative side of the diode bridge.

A report EE2002-83 by the institute of electronics, communication engineers discloses a switching power supply which has a converter like a single-stage type active clamping power factor correction converter with a PFC function, an insulation function, and an output-voltage stabilizing function. This switching power supply uses an active clamping flyback converter as a base, has a coil at the DC side of a diode bridge that rectifies a commercially available AC current, and improves the power factor by causing the current of the coil to operate in a discontinuous mode. In addition, various kinds of circuits are proposed for an insulating converter with a PFC function.

Also, JP 2008-306927 A discloses a technology which has a third winding and which supplies an output power by the third winding as an energy source for the primary side to the control circuit of a switching device connected in series to the primary winding of a transformer.

The most common circuit configuration, so-called a booster PFC converter, however, has no insulation function, and needs an insulation DC/DC converter having an insulation transformer and connected at the following stage of the PFC converter in order to obtain a voltage, such as a DC 24 V or a DC 12 V since it is a booster type, and thus obtaining a desired DC voltage. Hence, according to this configuration, a conversion circuit intervenes in order to obtain a DC voltage, so that the total conversion efficiency is poor and has a technical issue from the standpoint of energy saving.

Also, the circuit configuration disclosed in a report EE2002-83 employs a two-stage converter configuration, so that the conversion efficiency of power is a multiplication of the efficiencies of the two-stage converters, and thus the total conversion efficiency decreases.

Also, the technology disclosed in JP 2008-306927 A is insufficient for stabilization of the whole power efficiency and output voltage.

As explained above, according to the prior art, an applied voltage at the time of turn-off of a switching device that performs switching is high, the whole power efficiency is low, and the harmonic suppressing function and the instant power-suspension compensating function are insufficient, so that a capacitor with a large capacity is required, and thus a switching power supply becomes large and thick in size.

SUMMARY OF THE INVENTION

The present invention has been made in order to overcome such a problem, and it is an object of the present invention to provide a switching power supply which has an electric characteristic and form sufficient for accomplishing downsizing and thinning of a device provided with the power supply of the present invention.

In order to overcome the above-explained problem and to accomplish the above-explained object, the present invention is configured as follows.

That is, the present invention provides a switching power supply into which AC power is input and which outputs DC power electrically insulated from the AC power, the switching power supply including: a first rectification-smoothing unit that rectifies and smooths the AC power; an insulation transformer that includes at least a primary winding, a secondary winding, and a third winding; a second rectification-smoothing unit which is connected to the secondary winding, rectifies and smooths AC power from the secondary winding and outputs DC power; a first switching device that is connected between a DC-side terminal of the first rectification-smoothing unit and the primary winding; an inrush current suppressing unit which is connected to the primary winding in parallel therewith and which includes a second switching device; a charge storing unit that is connected to a DC side of the first rectification-smoothing unit; a third switching device that is connected in series to the DC side of the first rectification-smoothing unit so as to prevent the charge storing unit from discharging; a charging circuit that charges the charge storing unit with power from the third winding in a boosted manner; a fourth switching device which is connected between the charging circuit and the charge storing unit and which controls a charging current of the charging circuit; a power factor improving control unit which controls the first, second, third and fourth switching devices and which improves a power factor of the AC power to be input; and a power-suspension detecting unit that detects a power suspension of the AC power, the third switching device being controlled when the power-suspension detecting unit detects a power suspension of the AC power in order to cause the charge storing unit that stores a charge in advance to discharge the insulated DC power to an output side through the insulation transformer.

BRIEF DESCRIPTION OF THE DRAWINGS

FIG. 5A is a diagram showing a current path when the switching power supply of the first embodiment of the present invention is in a steady operation and showing Q1 turned on;

FIG. 5C is a diagram showing a current path when the switching power supply of the first embodiment of the present invention is in a steady operation and showing Q2 and Q4 turned on;

FIG. 7A is a diagram showing a current path when the switching power supply of the first embodiment of the present invention is in a low-input-voltage operation, and showing Q1 and Q3 turned on;

FIG. 7C is a diagram showing a current path when the switching power supply of the first embodiment of the present invention is in a low-input-voltage operation, and showing Q2 turned on;

FIG. 14 is a diagram showing how the substrate of the switching power supply according to the fourth embodiment of the present invention is mounted.

DETAILED DESCRIPTION OF THE PREFERRED EMBODIMENTS

Embodiments of the present invention will be explained below with reference to the accompanying drawings.

The present invention provides a switching power supply which reduces an applied voltage and an inrush current, suppresses an output voltage fluctuation and a switching loss, reduces the capacity of a capacitor, improves the power supply efficiency, and has a harmonic suppressing function and an instant power-suspension compensating function sufficient for accomplishing downsizing and thinning of a device provided with the power supply of the present invention. Such a switching power supply is embodied by following embodiments.

First Embodiment

A first embodiment of the present invention will be explained with reference to FIGS. 1 to 9. An explanation will be given of a circuit configuration of the first embodiment at first.

<Circuit Configuration of First Embodiment>

Figure 1:
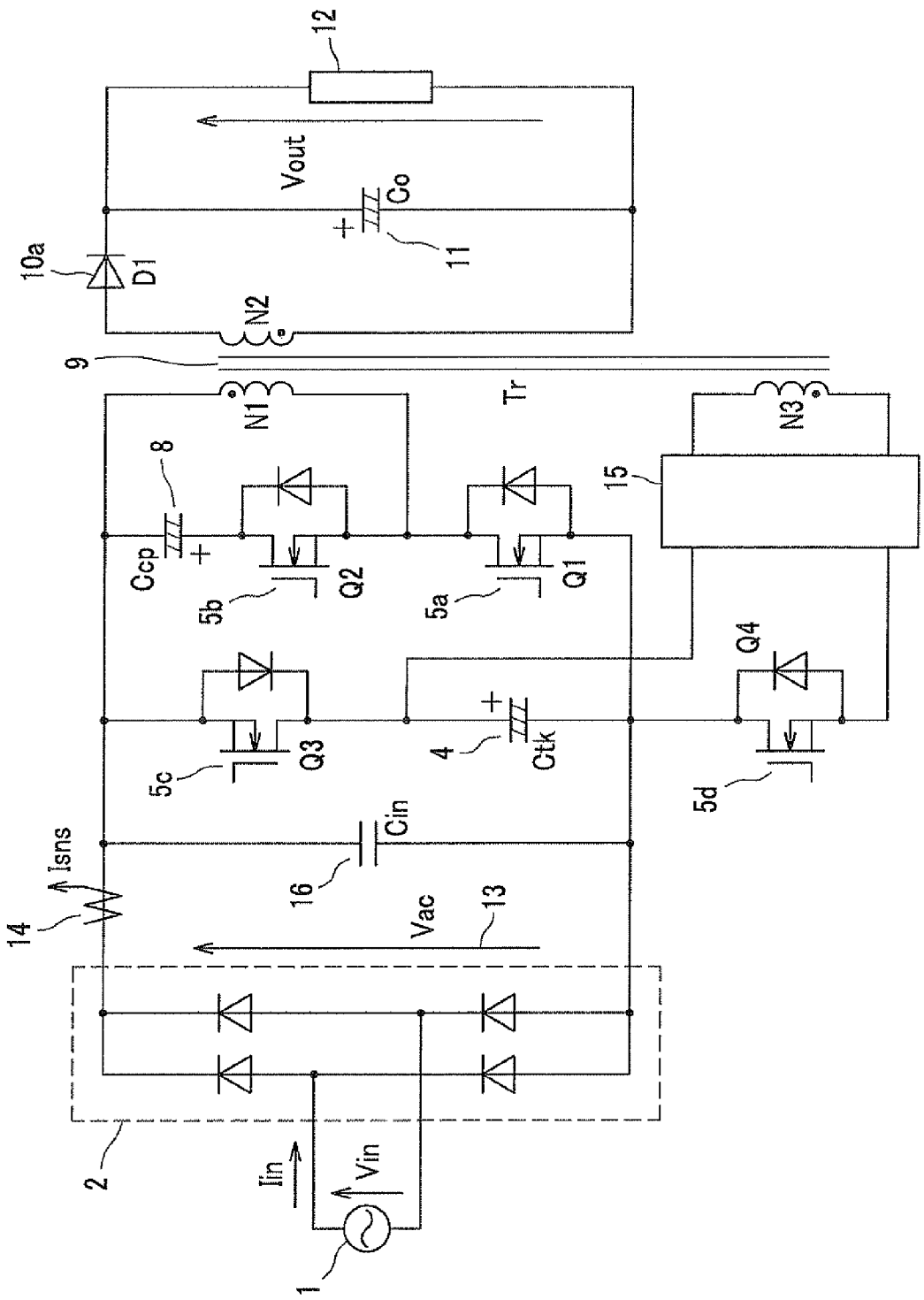
FIG. 1 is a circuit diagram showing a configuration of a switching power supply according to a first embodiment of the present invention.

FIG. 1 is a circuit diagram showing a configuration of a switching power supply according to the first embodiment of the present invention.

As shown in FIG. 1, an AC power 1 by an AC power supply 1 is subjected to full-wave rectification (see FIG. 4, a full-wave rectification waveform 13) through a diode bridge 2. An input capacitor 16 (Cin) is connected between the DC-side positive and negative terminals of the diode bridge 2. The input capacitor 16 is for filtering, and has a capacitance of several µF.

The diode bridge 2 (a rectification function) and the input capacitor 16 (a filtering function, a smoothing function) configure first rectification-smoothing means.

A current between the diode bridge 2 and the input capacitor 16 is detected as an input current Isns having undergone rectification by a current detector 14.

A series pair of a power MOSFET (Metal-Oxide-Semiconductor Field-Effect Transistor) 5c and a capacitor 4 (Ctk) is connected to the input capacitor 16 in parallel therewith.

The power MOSFET 5c (Q3, a third switching device) is an N-channel power MOSFET, has a source connected to a positive DC wiring, and a drain connected to the capacitor 4. The relationship between the source and the drain of the MOSFET changes depending on the direction of an applied voltage, but a side connected to the bulk is defined as the source. The power MOSFET 5c is connected in such a way as to inhibit discharging of the capacitor 4.

The capacitor 4 is for instant power-suspension compensating (an instant power-suspension compensating capacitor), and has a capacitance changing depending on an instant power-suspension compensating time, but 100 µF to 1000 µF or so.

An insulation transformer 9 (Tr) has a primary winding N1, a secondary winding N2, and a third winding N3. A series pair of the primary winding N1 of the insulation transformer 9 and an N-channel power MOSFET 5a (Q1, a first switching device) is connected to an input capacitor 16 in parallel therewith. At this time, the beginning (the black dot in FIG. 1) of the primary winding N1 is connected to the positive terminal of the input capacitor 16.

Moreover, a series pair of a capacitor 8 (Ccp) and an N-channel power MOSFET 5b (Q2, a second switching device) is connected to both ends of the primary winding N1 of the transformer. At this time, the drain of the power MOSFET 5a and the source of the power MOSFET 5b are connected together.

The series pair of the capacitor 8 and the power MOSFET 5b is inrush-current suppressing means for suppressing an excessive inrush current to flow in the power MOSFET 5a.

The end (the opposite side of the black dot in FIG. 1) of the secondary winding N2 of the insulation transformer 9 is connected to the anode of a diode 10a (D1), and an output smoothing capacitor 11 (Co) is connected between the cathode of the diode 10a and the beginning (the black dot in FIG. 1) of the secondary winding N2.

The diode 10a (a rectification function) and the output smoothing capacitor 11 (a smoothing function) configure second rectification-smoothing means which converts an AC power obtained from the secondary winding N2 of the insulation transformer 9 into a DC power.

A load 12 is connected to both ends of the output smoothing capacitor 11, and the DC power of the output smoothing capacitor 11 is supplied to the load 12.

A charging circuit 15 for charging the capacitor (the instant power-suspension compensating capacitor) 4 is connected to the third winding N3 of the insulation transformer 9. A power MOSFET 5d (Q4, a fourth switching device) is connected between the negative terminal of the capacitor 4 and the negative terminal of the charging circuit 15 which is a current inlet among the output terminals thereof.

At this time, the power MOSFET 5d has a drain connected to the negative side of the capacitor 4, and a source connected to the negative terminal of the charging circuit 15. The power MOSFET 5d is an N-channel power MOSFET which controls a charging current to the instant power-suspension compensating capacitor 4 from the charging circuit 15.

The charging circuit 15 and the instant power-suspension compensating capacitor 4 obtain power from the third winding N3 of the insulation transformer 9, but when the number of turns of the third winding N3 is increased in order to increase a voltage appropriately, the capacitance of the instant power-suspension compensating capacitor 4 can be reduced. Also, the instant power-suspension compensating capacitor 4 suppresses an output voltage drop of the output smoothing capacitor 11. Hence, according to this configuration, the instant power-suspension compensating capacitor 4 and the output smoothing capacitor 11 can be downsized.

Also, by providing the charging circuit 15 and by controlling a charging current to the instant power-suspension compensating capacitor 4 as will be discussed later, an initial charging circuit that is needed for the prior art can be eliminated.

According to the first embodiment, a supply voltage to the load 12 at the secondary side is designed to be 24 V, but the expected load 12 in practice includes a backlight, a logic circuit and a tuner of a liquid crystal television, each of which is connected to the load through an inverter or a DC/DC converter. Hence, the precision of an output voltage (supply voltage) that is 24 V can be set moderately in comparison with a configuration in which the load is directly connected, and the precision of the output voltage (the supply voltage) in the first embodiment is ±10% or so.

In FIG. 1, respective gate potentials of the power MOSFETs 5a, 5b, 5c, and 5d (Q1 to Q4), i.e., a controller (a control circuit block) for controlling (ON and OFF) switching is not illustrated. However, a computing unit (a controller) 51 (see FIG. 3) controls (a control circuit block, see FIG. 2) the power MOSFETs 5a, 5b, 5c, and 5d, so that DC power supplied to the load 12 from the AC power 1 is converted, and harmonic components during the conversion are eliminated, and thus the power factor is improved.

The control circuit block (see FIG. 2) and the controller 51 (see FIG. 3) will be discussed later in detail.

In the following explanation, the power MOSFETs 5a, 5b, 5c, and 5d will be simply referred to as switching devices Q1, Q2, Q3, and Q4, respectively.

In FIG. 1, a power-suspension detector (power-suspension detecting means) 21 (see FIG. 2) is not illustrated but it will be discussed in detail later.

In FIG. 1, the current detector 14 detects the input current Isns having undergone rectification. Also, an unillustrated voltage detector measures an input voltage waveform Vac having undergone full-wave rectification, an output voltage (Vout) 11, and an instant power-suspension compensating capacitor voltage Vtk of the capacitor 4 for instant power-suspension compensation.

<<Control Circuit Block>>

Figure 2:
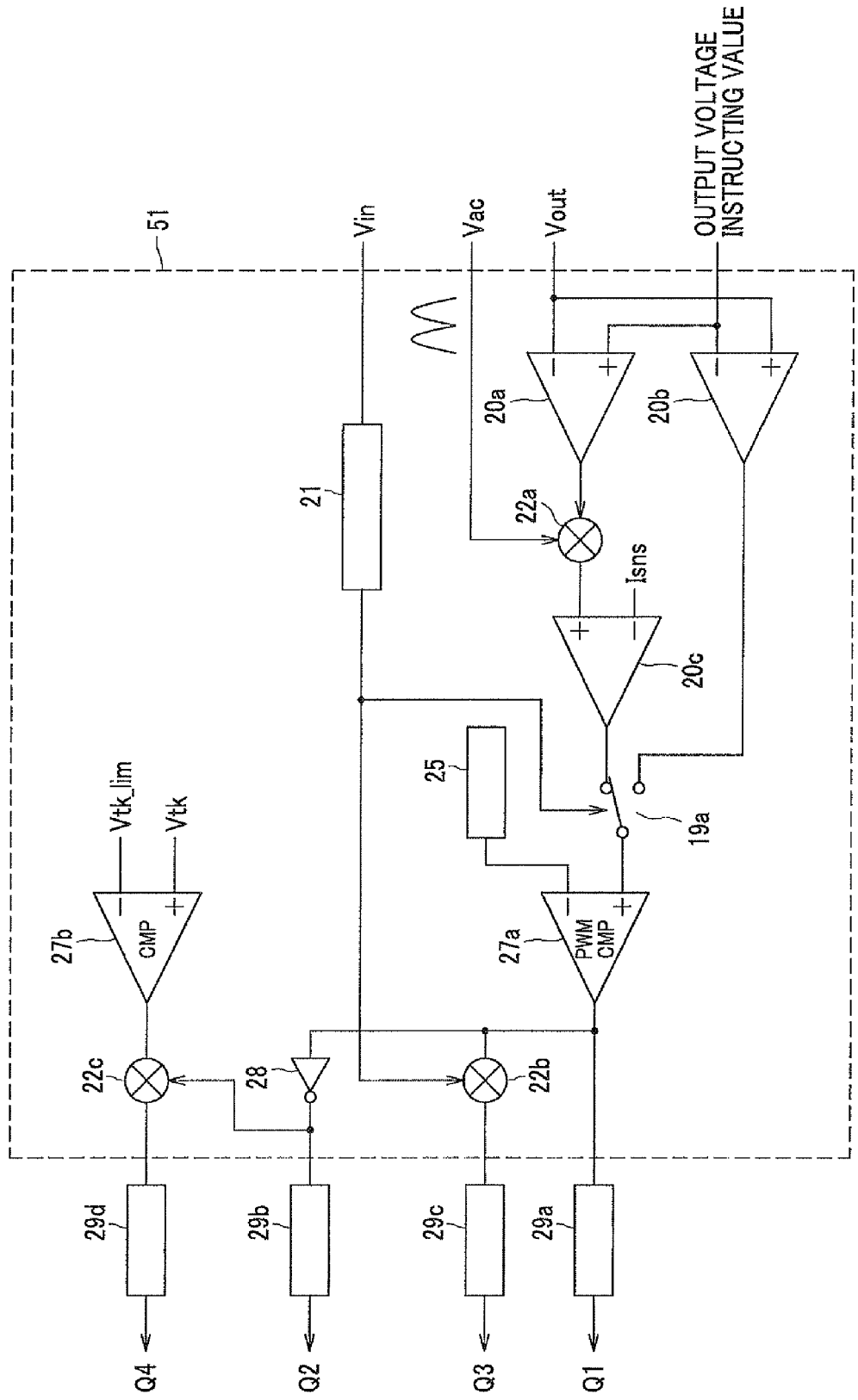
FIG. 2 is a block diagram showing a general configuration of a control circuit for the switching power supply according to the first embodiment of the present invention.

FIG. 2 is a block diagram showing a general configuration of a control circuit for the switching power supply according to the first embodiment.

In FIG. 2, a detecting system of the first embodiment detects and uses at least four values: the input voltage (an input voltage waveform, a full-wave rectification waveform) 13 having undergone full-wave rectification (Vac, see FIGS. 1 and 2), the input voltage Isns having undergone rectification; the output voltage Vout (see FIGS. 1 and 2); and the voltage (the instant power-suspension compensating capacitor voltage Vtk, see FIG. 2) of the capacitor 4 (see FIG. 1) for instant power-suspension compensation.

Among such values, a value of a voltage system has a response with a margin in time, so that the number of detecting operations may be reduced like once for each several control cycles. Regarding the current, however, it is desirable to obtain a current value at a cycle as short as possible.

The controller 51 (see FIG. 3) internally calculates each of the above-explained obtained values, and outputs a pulse-width control signal for controlling each of the four switching devices Q1 to Q4. When those output signals are applied to respective gate terminals of the power MOSFETs 5a to 5d directly or indirectly through a driver IC, etc., the circuit shown in FIG. 1 is activated.

<<Control Flow>>

The control for the switching power supply includes a digital control and an analog control, but a basic control flow in a case in which an analog circuit is employed as an example case will be explained with reference to FIG. 2.

In FIG. 2, an input voltage Vin is a voltage of the AC power 1 that is a commercially available AC source, and is input in the power-suspension detector 21. The output by the power-suspension detector 21 is input into a switch 19a.

The output voltage Vout is input into respective inverting input terminals of amplifiers 20a and 20b. An output voltage instructing value is input into respective non-inverting input terminals of the amplifiers 20a and 20b. The output by the amplifier 20a is input into a multiplier 22a. An input voltage waveform Vac is also input into the multiplier 22a. The output by the multiplier 22a is input in the non-inverting input terminal of an amplifier 20c. A signal obtained by converting the input current Isns having undergone rectification into a voltage is input into the inverting input terminal of the amplifier 20c. The output by the amplifier 20c is input into one terminal of the switch 19a.

Also, the output by the amplifier 20b is input into another terminal of the switch 19a. The switch 19a changes the output by the amplifier 20b and the output by the amplifier 20c in accordance with the output by the power-suspension detector 21, and changes an operation between a steady operation mode (a current carrying mode) and a power suspended mode.

The switch 19a is connected to the positive input of a PWM (Pulse Width Modulation) comparator 27a. The negative input of the PWM comparator 27a is connected to a triangular-wave generator 25. Also, the PWM comparator 27a is denoted as "PWM CMP".

The output by the PWM comparator 27a is input into the gate of the switching device Q1, i.e., the power MOSFET 5a through a driver 29a. The output by the PWM comparator 27a is also input into the gate of the switching device Q2, i.e., the power MOSFET 5b through a NOT circuit 28 and a driver 29b.

The output by the PWM comparator 27a is further input into a multiplier 22b together with the output by the power-suspension detector 21, and the output by the multiplier 22b is input into a driver 29c. The output by the driver 29c is input into the gate of the switching device Q3, i.e., the power MOSFET 5c.

The instant power-suspension compensating capacitor voltage Vtk that is a voltage of the instant power-suspension compensating capacitor 4 is input into the positive input terminal of a comparator 27b, and is compared with an upper limit (instant power-suspension compensating capacitor voltage Vtk_lim) of a reference value input into the negative input terminal. When it is less than or equal to the upper limit, the output by the comparator 27b is input into a multiplier 22c, so that a driver 29d outputs a pulse signal with the same phase as that of the switching device Q2 into the gate of the switching device Q4, i.e., the power MOSFET 5d.

In the case of a digital control, a power-suspension detecting signal can be generated based on a determination of a value of the input voltage waveform Vac, which simplifies the circuit configuration.

<<Computing Unit>>

Figure 3:
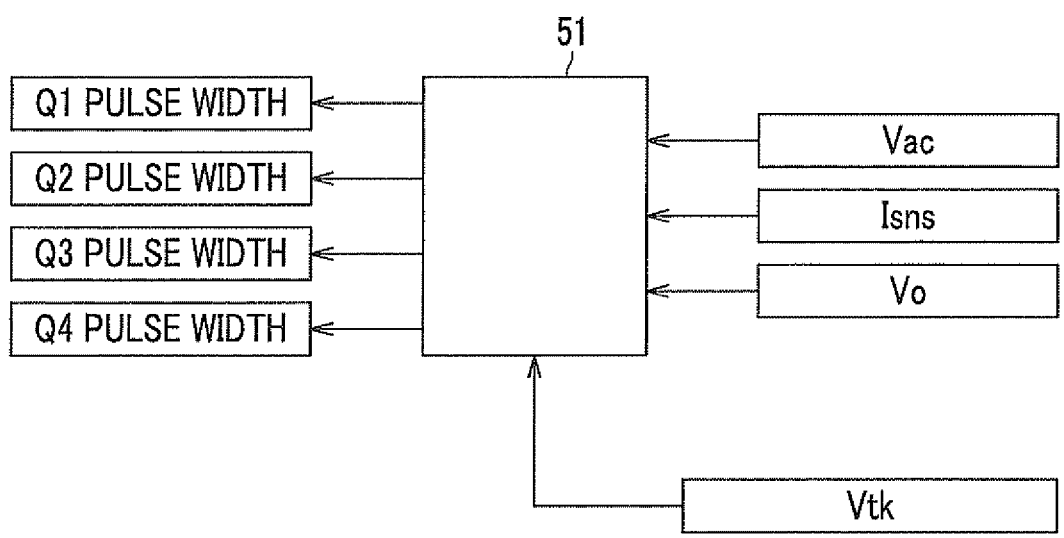
FIG. 3 is a block diagram showing input and output signals to and from a computing unit of the switching power supply according to the first embodiment of the present invention.

FIG. 3 is a block diagram showing input and output signals of the computing unit of the switching power supply according to the first embodiment.

In FIG. 3, input into the computing unit, i.e., the controller 51 are respective signals of the input voltage Vin (or the input voltage waveform Vac having undergone full-wave rectification), the input current Isns (the input current Isns having undergone rectification), an output voltage Vo, and the instant power-suspension compensating capacitor voltage Vtk. The controller 51 determines a condition and a status based on those pieces of information, and sets pulse-width control waveforms which are control signals for the switching devices Q1 to Q4, respectively, and outputs the set waveforms.

The computing unit, i.e., the controller 51 shown in FIG. 3 is a part of the control circuit shown in FIG. 2.

Examples of the controller IC of the controller 51 are an FPGA (Field-Programmable Gate Array), an ASIC (Application Specific Integrated Circuit), and a DSP (Digital Signal Processor), and an inexpensive microcomputer may be used instead.

Various kinds of controller ICs are used as an actual product (component) and various kinds of functions are built therein. Depending on what IC component the controller IC (the controller 51) employs, the function borne by the controller IC in the control circuit shown in FIG. 2 varies, and the configuration of the control circuit block shown in FIG. 2 also varies.

For example, input signals, such as the output voltage Vout and the input voltage waveform Vac shown in FIG. 2 are detected by a detector circuit shown in FIG. 12 and explained later, but a configuration having an ADC (Analog to Digital Converter, A/D converter IC) built in a detector directly receives an analog signal, and a configuration having no ADC allows the controller IC to receive a digital signal that is converted by an ADC separately provided outside the controller IC.

Also, as will be discussed later, according to the present invention, in order to further change the operation condition between a phase at which an input voltage is high and a sufficient input current is obtained and a phase (around a so-called zero cross) at which the input voltage is low and an input voltage is hardly obtained, a digital control is appropriate. Hence, operations explained together with FIG. 3 are executed in practice for performing arithmetic processing in accordance with respective detected values, and the control signals for respective gates are output.

<Relationship Between Input Voltage and Input Current of Commercially Available AC>

Figure 4:
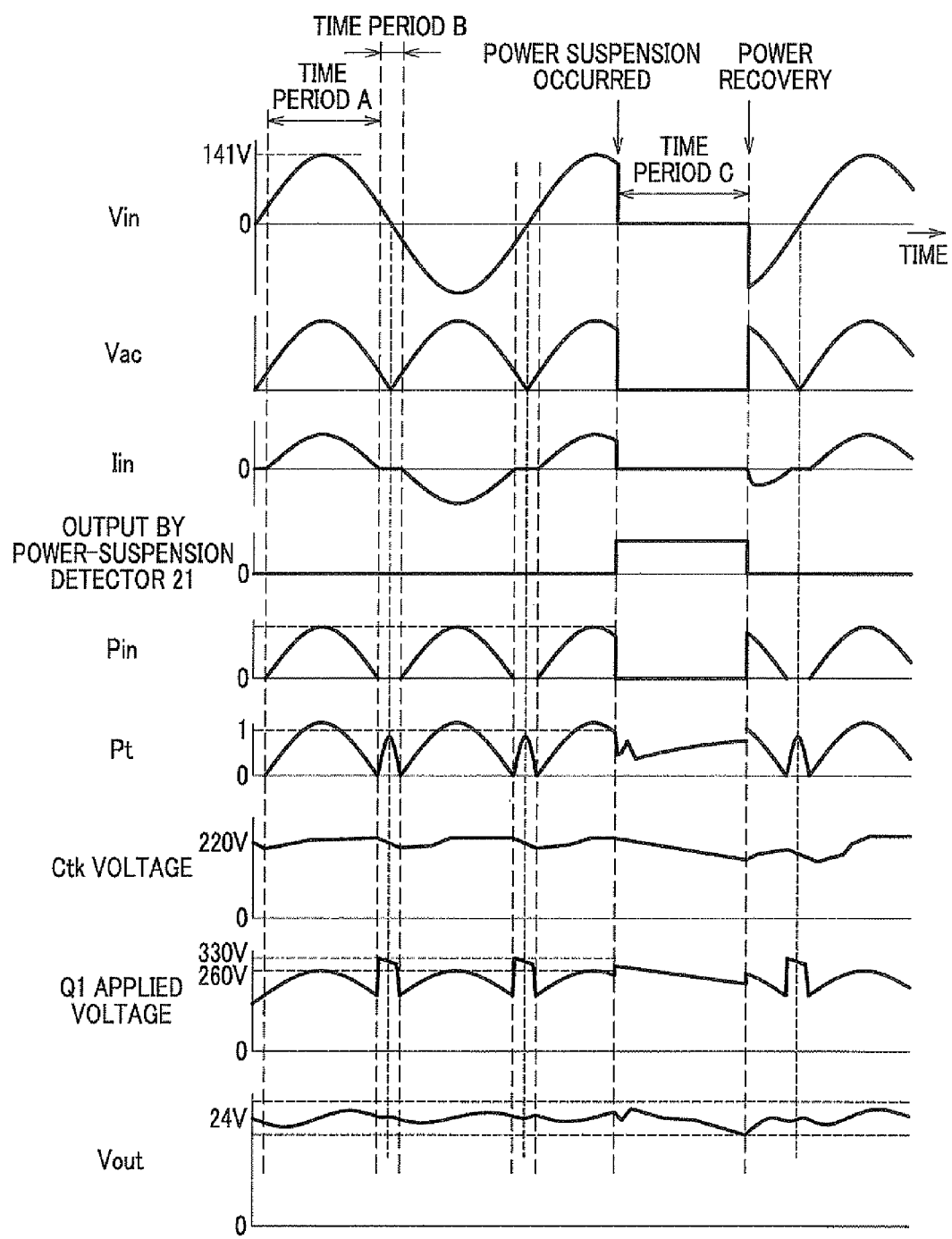
FIG. 4 is a diagram showing operating waveforms of major voltage, current and power of the switching power supply according to the first embodiment of the present invention.

FIG. 4 is a diagram showing major voltage, current, and power operating waveforms of the switching power supply according to the first embodiment.

FIG. 4 shows a relationship among an input voltage Vin, an input current Iin, and input power Pin of commercially available AC (AC power).

In a steady operation (where no power suspension occurs), with respect to the input voltage Vin of the AC power 1 (see FIG. 1), the rectification means of the diode bridge 2 (see FIG. 1) transmits the input voltage waveform (full-wave rectification waveform) Vac having undergone full-wave rectification to the input capacitor 16 (see FIG. 1).

When the power factor is improved so as to satisfy the standard for an input harmonic in accordance with the process explained in FIG. 3, the input current waveform can be controlled so as to be a substantially sinusoidal waveform like the input current Iin in FIG. 4. The specific method of improving the power factor will be explained later in detail.

Since power is proportional to a product of the voltage by the current, the input power waveform also shows a substantially sinusoidal waveform like the input power Pin. That is, when the absolute value of the input voltage 13 is small, there is a phase at which the input power is zero or is extremely small.

Regarding the time period in the steady operation, a time period when the absolute value of the input voltage Vin is large and the input power Pin≠0 is defined as a time period A, a time period near a so-called zero cross passing through 0 V with the absolute value of the input voltage Vin being small is defined as a time period B, and a time period during an instant power-suspension is defined as a time period C, and the following explanation will be given based on such definition.

In the first embodiment, during the time period C of the instant power-suspension, operations of detecting a power suspension and of compensating an output voltage at the time of detection are performed.

In practice, the boundary between the time period A and the time period B may vary depending on an operation condition, and cannot be strictly defined, so that an arbitrary threshold for the input voltage waveform Vac having undergone full-wave rectification is set and it is determined whether the current time period is the time period A or the time period B by comparing the value of the input voltage waveform Vac with such threshold.

The delivered power waveform when power is delivered from the primary side to the secondary side becomes, like a secondary-side delivered power Pt shown in FIG. 4, a waveform obtained by adding the input power Pin during the time period A with a voltage supplied from the instant power-suspension compensating capacitor 4 (Ctk, see FIG. 1) during the time period B.

The voltage of the instant power-suspension compensating capacitor 4 (Ctk, see FIG. 1) is steadily maintained at an upper-limit voltage (in the first embodiment, 220 V), but drops through an operation during the time period B, so that the switching device Q4 is controlled during the following time period A in order to perform charging with an output by the third winding, and thus the voltage is charged to the upper-limit voltage again and then maintains this state.

Next, an explanation will be given of an operation when an instant power-suspension occurs which is the time period C.

When an instant power-suspension occurs and the output by the power-suspension detector 21 (see FIG. 2) becomes a high level (High) (a power-suspension detected state), as shown in FIG. 4, the input voltage Vin, the input current Iin, and the input power Pin all become 0, so that a control is performed which causes the switching device Q3 to be turned on and the instant power-suspension compensating capacitor 4 (Ctk, see FIG. 1) to supply power in order to maintain the output voltage Vout to be constant.

During this time period, since a Ctk voltage that is the voltage of the instant power-suspension compensating capacitor 4 consistently drops during the time period C, charging from the third winding N3 is performed during the time period A after the recovery.

When it becomes the time period B before the voltage reaches the predetermined upper-limit voltage, the switching device Q4 is turned off in order to stop charging to the instant power-suspension compensating capacitor 4, and the switching device Q3 is controlled so that the instant power-suspension compensating capacitor 4 is caused to deliver power, and charging is started again in the next time period A.

That is, the switching device Q3 and the switching device Q4 are controlled so that respective on time periods are exclusive with respect to each other, the switching device Q4 is turned on when the instant power-suspension compensating capacitor 4 is charged and the switching device Q3 is turned on when letting the instant power-suspension compensating capacitor 4 to discharge, so that a charging period and a discharging period are controlled so as not to overlap with each other.

<Circuit Operation in Steady State>

Next, a detail of a circuit operation in a steady state will be explained with reference to a circuit diagram and an operating waveform diagram.

First, a basic operation for each switching cycle during the time period A in the steady state will be explained with reference to FIGS. 5A to 6.

FIGS. 5A to 5D are diagrams exemplary showing a current path of the switching power supply in a steady operation according to the first embodiment, and explaining the input capacitor 16 (Cin, see FIG. 1) as Cin that is a variable power supply.

<<Time Period A and High Input Voltage Operation>>

Figure 5A:
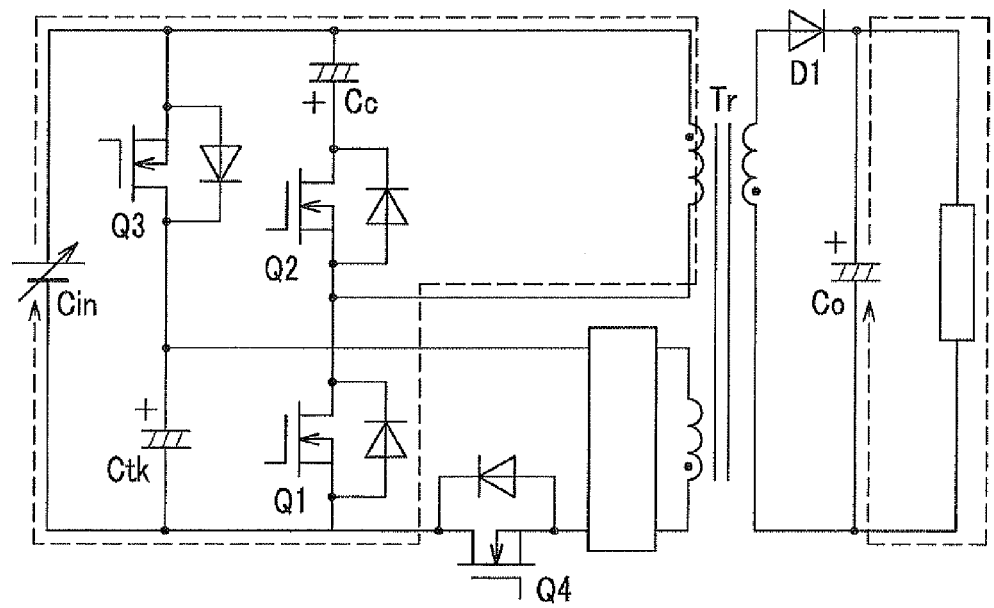

FIG. 5A shows a flow of a current when the switching device Q1 is turned on in the time period A (see FIG. 4) in the steady operation.

During the time period A (see FIG. 4), since the input voltage waveform Vac (see FIG. 1, Vac) corresponding to the output by the diode bridge 2 (see FIG. 1) is large, by turning on of the switching device Q1, the current flows in the switching device Q1 from the variable power supply Cin through the primary winding (N1, see FIG. 1) of the transformer Tr (9, see FIG. 1). At this time, the transformer Tr is excited, but the secondary winding thereof (N2, see FIG. 1) is in a direction blocked by the diode D1 (10a, see FIG. 1) and no current flows therethrough, and no power is transmitted to the secondary side. However, charges in the output smoothing capacitor Co (11, see FIG. 1) from the load (12, see FIG. 1) is discharged.

Also, at the third winding (N3, see FIG. 1), the switching device Q4 is turned off and the charging function by the charging circuit 15 is deactivated, so that the instant power-suspension compensating capacitor Ctk (4, see FIG. 1) is not charged and no current is generated.

Figure 5B:
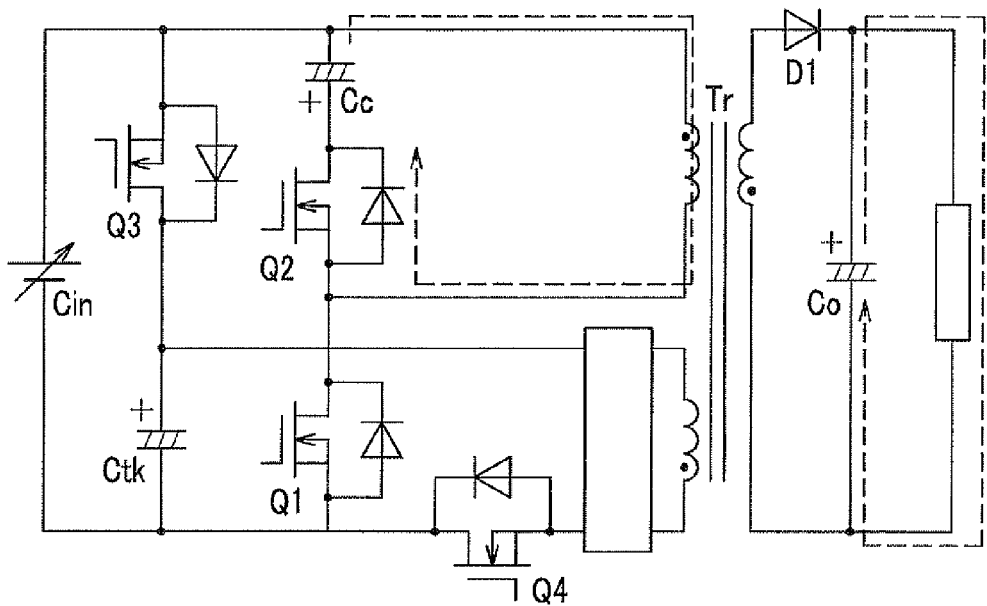
FIG. 5B is a diagram showing a current path when the switching power supply of the first embodiment of the present invention is in a steady operation and showing Q1 turned off.

FIG. 5B shows a flow of a current when the switching device Q1 is turned off during the time period A (see FIG. 4) in the steady operation.

In FIG. 5B, when the switching device Q1 is turned off, as is indicated by an arrow in FIG. 5B, a current flowing through the switching device Q1 is not allowed to flow through the switching device Q1, and is caused to flow in the parasitic diode of the switching device Q2. Accordingly, like a waveform IQ2 shown in FIG. 6 and explained later, the current of the switching device Q2 largely swings over to the negative polarity.

Figure 5C:
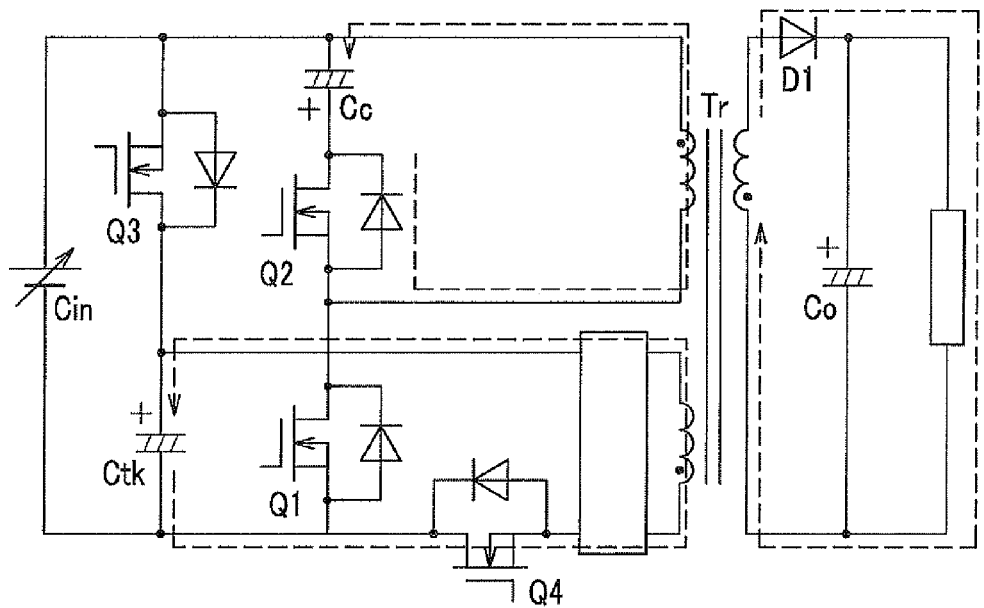

FIG. 5C shows a flow of a current when the switching device Q1 is turned off and the switching devices Q2 and Q4 are turned on during the time period A (see FIG. 4) in the steady operation.

In FIG. 5C, when the switching devices Q2 and Q4 are turned on, a current is supplied to the load at the secondary side as shown in FIG. 5C, and the instant power-suspension compensating capacitor Ctk (4, see FIG. 1) is charged by a current from the third winding (N3, see FIG. 1) at the primary side.

Also, when the current is negative, it means that the current is flowed in a parasitic diode, and no current flows through the switching device Q2. Hence, when the switching device Q2 is turned on with the current being negative, it means that the switching device Q2 is turned on with the current flowing therein being 0, so that it becomes ZCS (Zero Current Switching), and thus the switching loss can be suppressed.

Figure 5D:
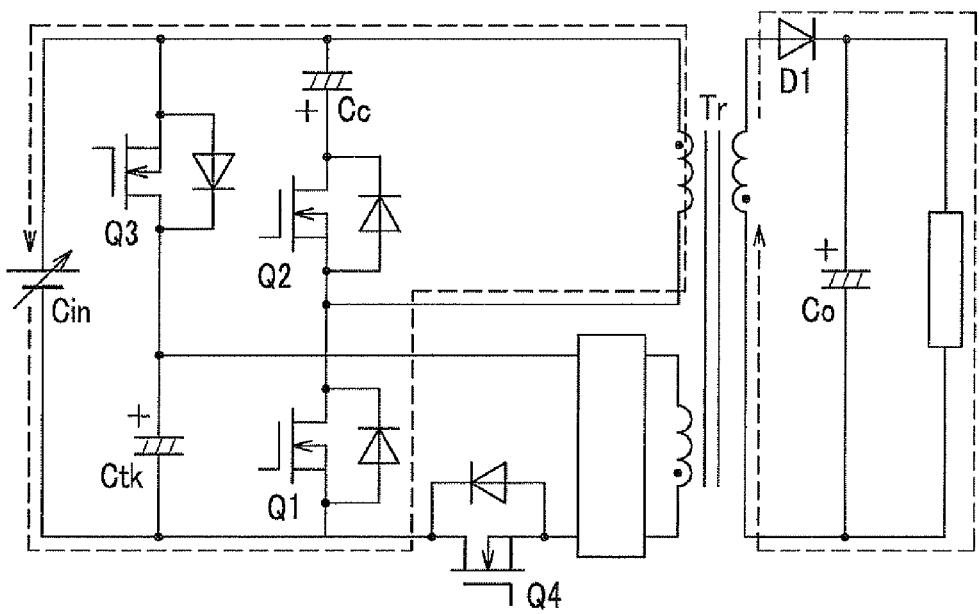
FIG. 5D is a diagram showing a current path when the switching power supply of the first embodiment of the present invention is in a steady operation and showing Q2 and Q4 turned off.

FIG. 5D shows a flow of a current when the switching device Q1 is turned off and the switching devices Q2 and Q4 are turned off during the time period A (see FIG. 4) in the steady operation.

In FIG. 5D, at a time point when the voltage of the instant power-suspension compensating capacitor Ctk (4, see FIG. 1) reaches a set value defined individually, as is already explained, the switching device Q4 is turned off to terminate charging to the instant power-suspension compensating capacitor Ctk.

Thereafter, when the switching devices Q2 and Q4 are turned off, as is indicated by an arrow in FIG. 5D, the current flowing through the switching device Q2 is caused to flow in the parasitic diode of the switching device Q1, and like a waveform IQ1 shown in FIG. 4, the current of the switching device Q1 largely swings over to negative.

When the switching device Q1 is turned on at this timing, it means that the switching device Q1 is turned on with the current thereof being negative, so that it becomes ZCS because of the above-explained reason, and thus the switching loss can be suppressed, thereby improving the efficiency.

<Operating Waveform During Time Period A>

Figure 6:
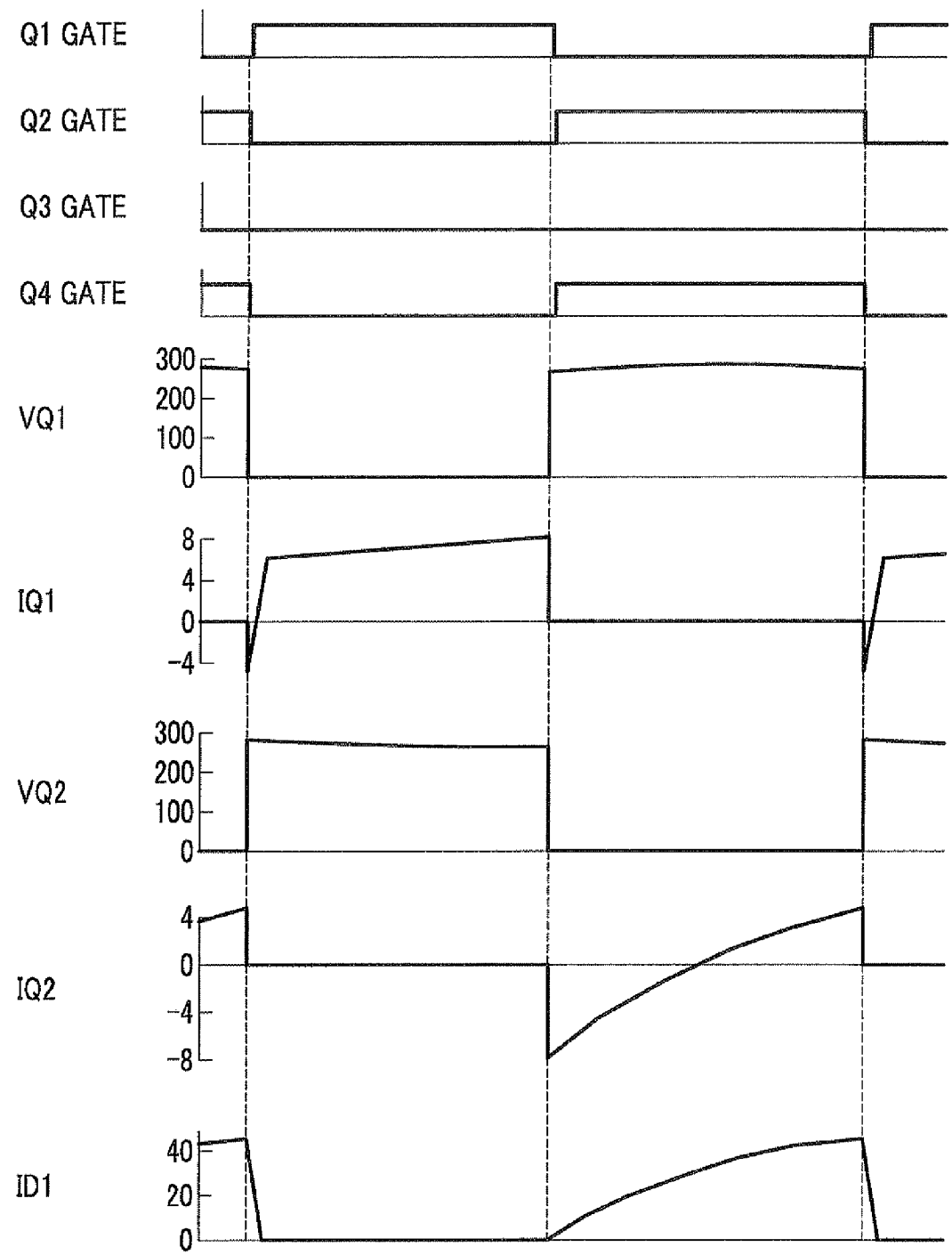
FIG. 6 is a diagram showing an operating waveform of the switching power supply of the first embodiment of the present invention when in a steady operation.

FIG. 6 is a diagram showing an operating waveform of the switching power supply during the time period A in the steady operation according to the first embodiment.

In FIG. 6, a timing at which a Q1 gate is high level (High) and the switching device Q1 is turned on indicates a voltage and a current waveform corresponding to FIG. 5A, and a timing at which the Q1 gate, a Q2 gate, and a Q4 gate are low level (Low) and the switching devices Q1, Q2, and Q4 are turned off indicates a voltage and a current waveform corresponding to FIG. 5B. Also, a timing at which the Q1 gate is low level (Low), the switching device Q1 is turned off, the Q2 and Q4 gates are high level (High) and the switching devices Q2 and Q4 are turned on indicates a voltage and a current waveform corresponding to FIG. 5C, and a timing at which the Q1 gate is low level (Low), the switching device Q1 is turned off, the Q2 and Q4 gates are low level (Low) and the switching devices Q2 and Q4 are turned off indicates a voltage and a current waveform corresponding to FIG. 5D.

Note that VQ1 indicates a voltage applied across the source and the drain of the switching device Q1. When the Q1 gate that is the gate potential of the switching device Q1 is high level (High), the switching device Q1 is in an on state, so that VQ1 becomes 0, and the current IQ1 is flowing across the source and the drain of the switching device Q1.

When the Q1 gate that is the gate potential of the switching device Q1 is low level (Low), the switching device Q1 is in an off state, so that the VQ1 that is a high voltage is applied and the current IQ1 across the source and the drain of the switching device Q1 is 0.

Also, the same is true of the relationship among the Q2 gate, VQ2, and IQ2 of the switching device Q2 as that of the switching device Q1. However, at an instant at which the Q1 gate is turned off with the Q2 gate of the switching device Q2 being low level (Low), a high voltage is applied across the source and the drain of the switching device Q2, so that IQ2 that is a negative current flows, i.e., a current flows in the parasitic diode of the switching device Q2.

During the time period A, the Q3 gate maintains low level and the switching device Q3 maintains an off state.

<Power Factor Improving Operation>

An explanation will be given of a power factor improving operation with reference to FIGS. 4 and 6.

The time period A shown in FIG. 4 is roughly 10 ms, and a time period when the Q1 and Q2 gates repeat high level and low level is roughly 10 μs. That is, as the Q1 and Q2 gates shown in FIG. 6 repeat high level and low level during the time period A shown in FIG. 4 and roughly 10 ms, the switching operations of the switching devices Q1 and Q2 (see FIG. 1) are repeated by substantially 1000 times.

At this time, if the time period when the Q1 and Q2 gates are high level and low level is changed or if the ratio of a high-level period and a low-level period is changed, the current waveform of a harmonic component in the input current Iin changes. Based on this principle, when the controller 51 (see FIG. 3) optimally controls respective switching operations of the switching devices Q1, Q2, Q3, and Q4 (see FIG. 1) including a pulse width depending on a situation, a harmonic component in the input current Iin of the AC power 1 can be eliminated and the power factor can be improved.

<<Time Period B and Low Input Voltage Operation>>

Next, a basic operation for each switching cycle in the steady state will be explained with reference to FIGS. 7A to 8.

FIGS. 7A to 7D are diagrams exemplary showing a current path of the switching power supply at the time of a low input voltage operation in the steady state according to the first embodiment.

Figure 7A:
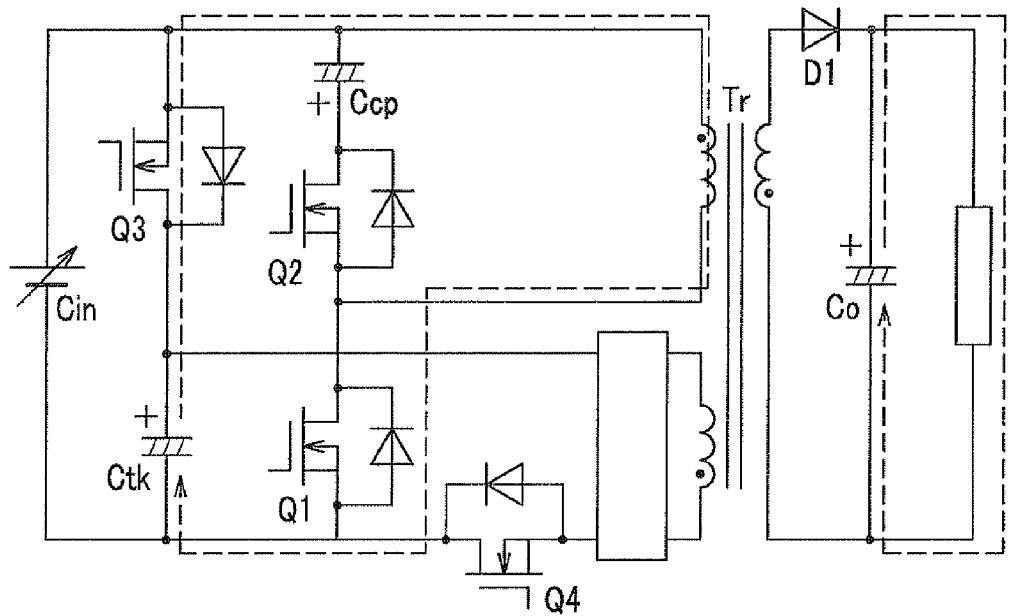

FIG. 7A shows a flow of a current when the switching devices Q1 and Q3 are in an on state during the time period B (see FIG. 4) in the steady operation. In the case of the above-explained time period B when the absolute value of the input voltage Vin (see FIG. 1) of commercially available AC (AC power) is small, as explained above, substantially no input current is generated as it is or an input current with a small value is generated, so that the transformer Tr is not excited by an energy (power) to be transferred to the secondary side in a normal operation.

According to the first embodiment, however, by causing the switching device Q3 to turn on before the switching device Q1, the instant power-suspension compensating capacitor Ctk that is connected in series to the switching device Q3 functions as if it is an input power supply in the primary side circuit, so that a current is generated in a direction of an arrow shown in FIG. 7A.

Figure 8:
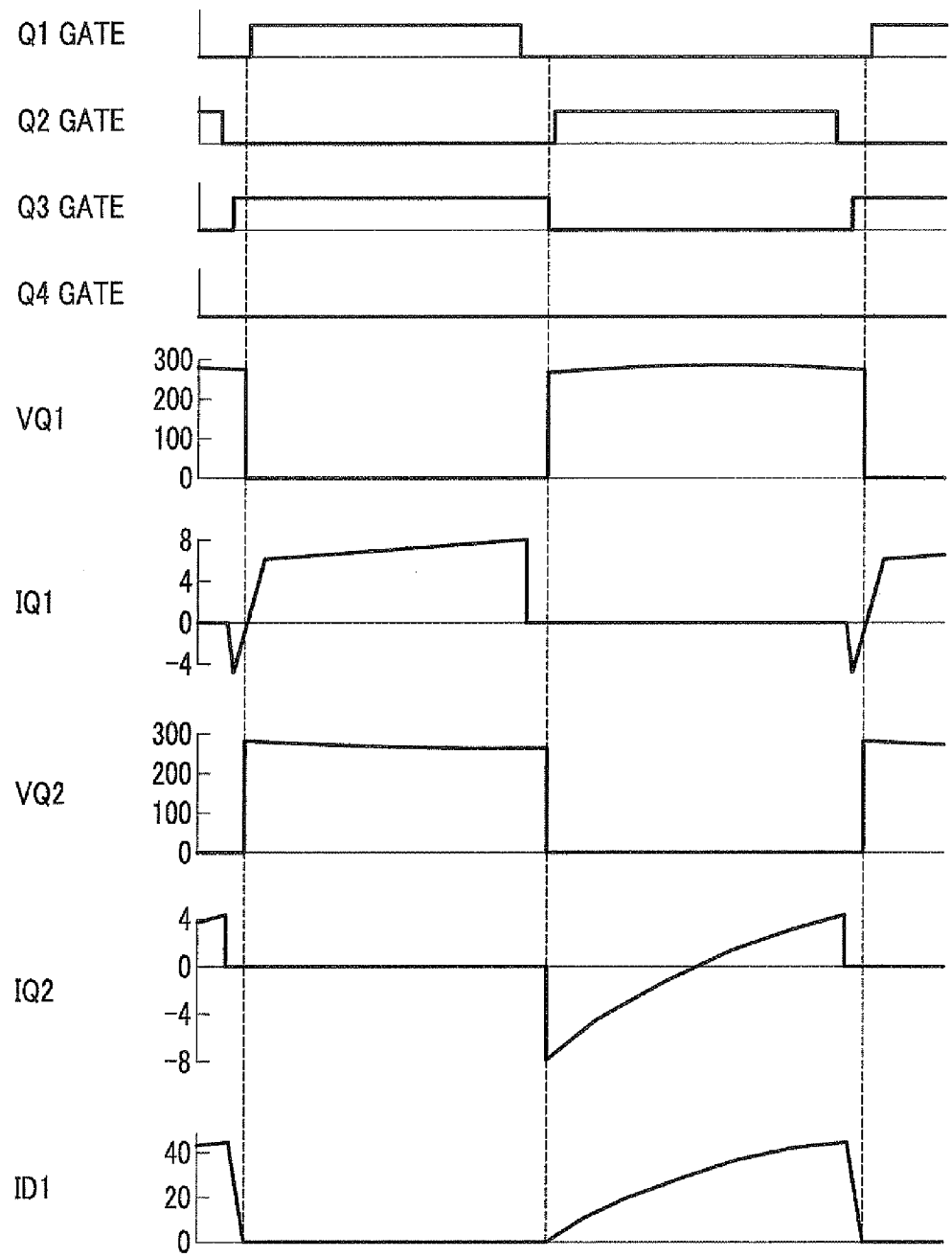
FIG. 8 is a diagram showing an operating waveform of the switching power supply of the first embodiment of the present invention when in a low-input-voltage operation.

At this time, as shown in FIG. 8, the waveform of an input current of the current IQ1 flowing through the switching device Q1 (see FIG. 1) becomes a waveform that gradually increases like a time period when the Q1 gate is high level at IQ1 like the case shown in FIG. 6, and the transformer Tr stores an energy.

Figure 7B:
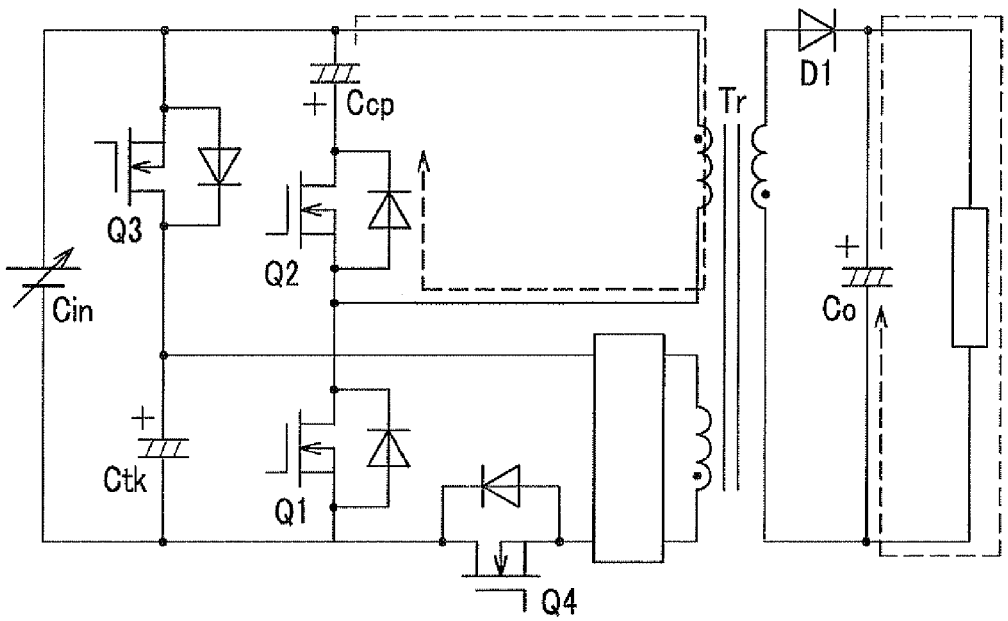
FIG. 7B is a diagram showing a current path when the switching power supply of the first embodiment of the present invention is in a low-input-voltage operation, and showing Q1 and Q3 turned off.

FIG. 7B shows a flow of a current when the switching device Q3 is in an off state and the switching device Q1 is turned off during the time period B (see FIG. 4) in the steady operation.

In FIG. 7B, when the switching device Q1 is turned off, the current flowing through the switching device Q1 is caused to flow in the parasitic diode of the switching device Q2 (an arrow of a dashed line), and like the waveform of IQ2 in FIG. 8, the current of the switching device Q2 largely swings over to negative.

Figure 7C:
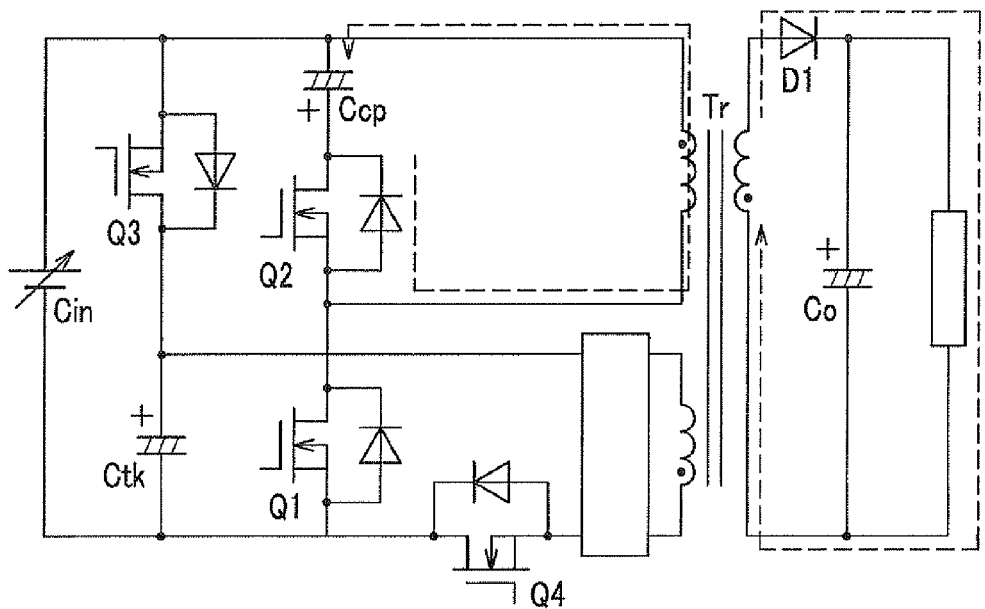

FIG. 7C shows a flow of a current when only the switching device Q2 is in an on state during the time period B (see FIG. 4) in the steady operation.

During the time period B, when only the switching device Q2 is in an on state, as shown in FIG. 7C, a current is supplied to the load at the secondary side. Also, the switching device Q2 is in an on state with the current thereof being negative, so that it becomes ZCS because of the above-explained reason, and thus the switching loss can be suppressed.

Figure 7D:
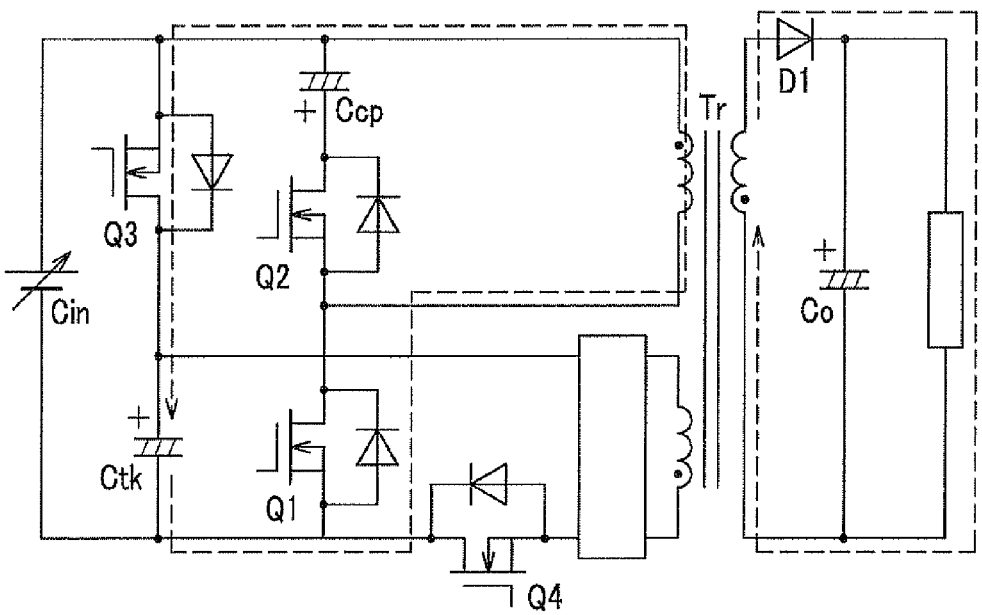
FIG. 7D is a diagram showing a current path when the switching power supply of the first embodiment of the present invention is in a low-input-voltage operation, and showing Q2 turned off.

FIG. 7D shows a flow of a current when the switching device Q2 is turned on during the time period B (see FIG. 4) in the steady operation.

As shown in FIG. 7D, when the switching device Q2 is turned off, as is indicated by an arrow in FIG. 7D, a current flowing through the switching device Q2 is caused to flow in the parasitic diode of the switching device Q1. Hence, like the waveform IQ1 shown in FIG. 8, the current of the switching device Q1 largely swings over to negative.

When the switching device Q1 is turned on again at this timing, it means that the switching device Q1 is turned on with the current thereof being negative, so that it becomes ZCS because of the above-explained reason, and thus the switching loss is suppressed, thereby improving the efficiency.

<<Time Period C and when Instant Power-Suspension is Detected>>

Next, an explanation will be given of an operation at the time of detecting instant power-suspension.

Figure 9:
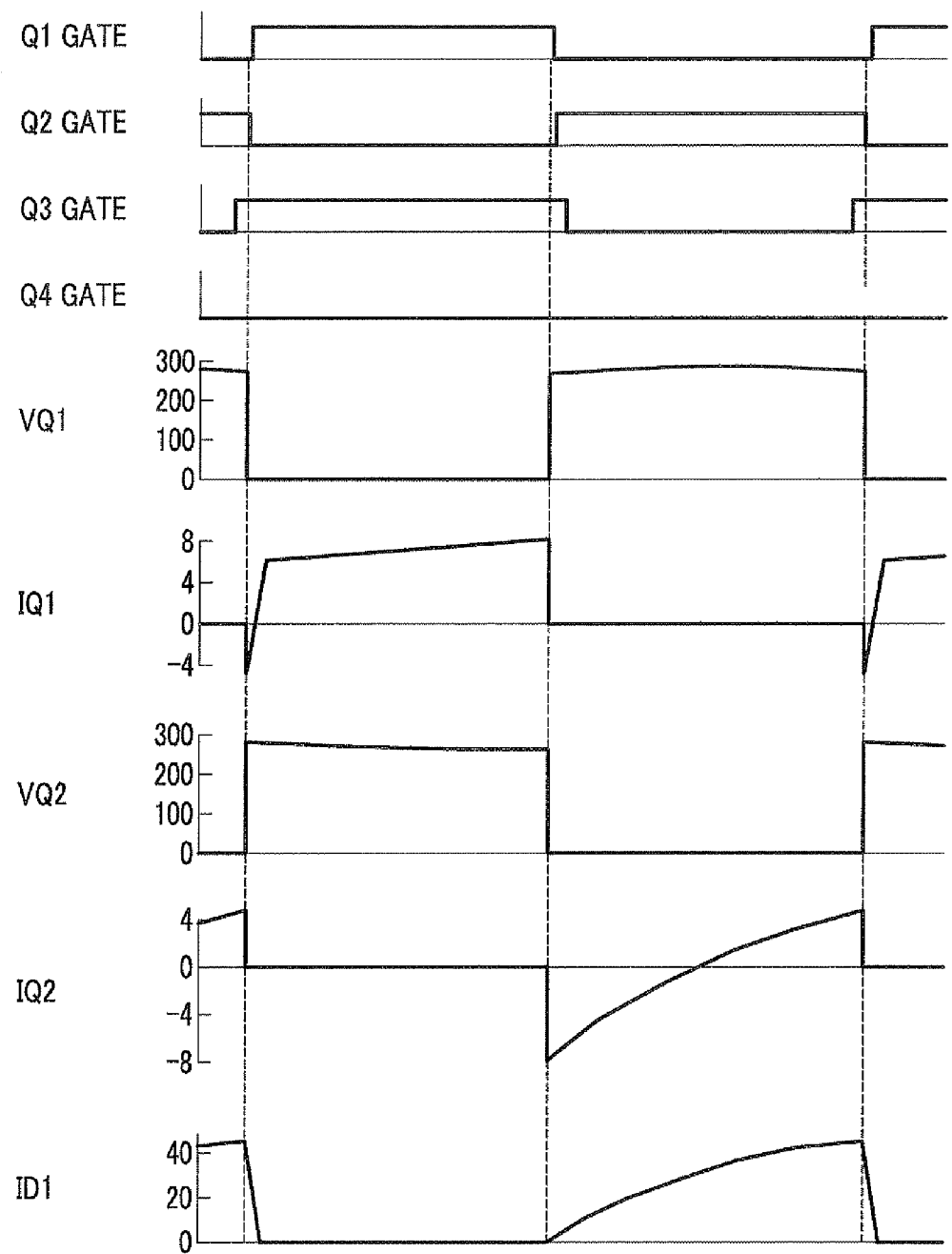
FIG. 9 is a diagram showing an operating waveform of the switching power supply of the first embodiment of the present invention when power is suspended.

An explanation will be given of, with reference to FIGS. 9 and 10, a basic operation for each switching cycle during the time period C (see FIG. 4) at the time of detecting instant power-suspension.

When the power-suspension detector 21 (see FIG. 2) detects a sharp drop of the input voltage of commercially available AC (AC power) (the time period C, see FIG. 4), as shown in FIG. 4, the input current also decreases, and the input power is lost, so that no power can be transferred to the secondary side.

The output voltage Vout (see FIG. 4) drops and is out of a controllable range as it is, so that the switching device Q3 is turned on in order to cause the instant power-suspension compensating capacitor 4 (Ctk, see FIG. 1) to supply energy. At this time, when the instant power-suspension compensating capacitor 4 (Ctk, see FIG. 1) is being charged by the third winding N3 (see FIG. 1), it is not illustrated in the figure but the switching device Q4 halts its operation and then the switching device Q3 is turned on.

Thereafter, by turning on of the switching device Q1, a current is generated at the transformer Tr. Next, by turning off of the switching device Q1 and turning on of the switching device Q2, a current is supplied to an output capacitor and the load at the secondary side through the diode D1, and the output voltage Vout can be maintained within the controllable range.

Figure 10:
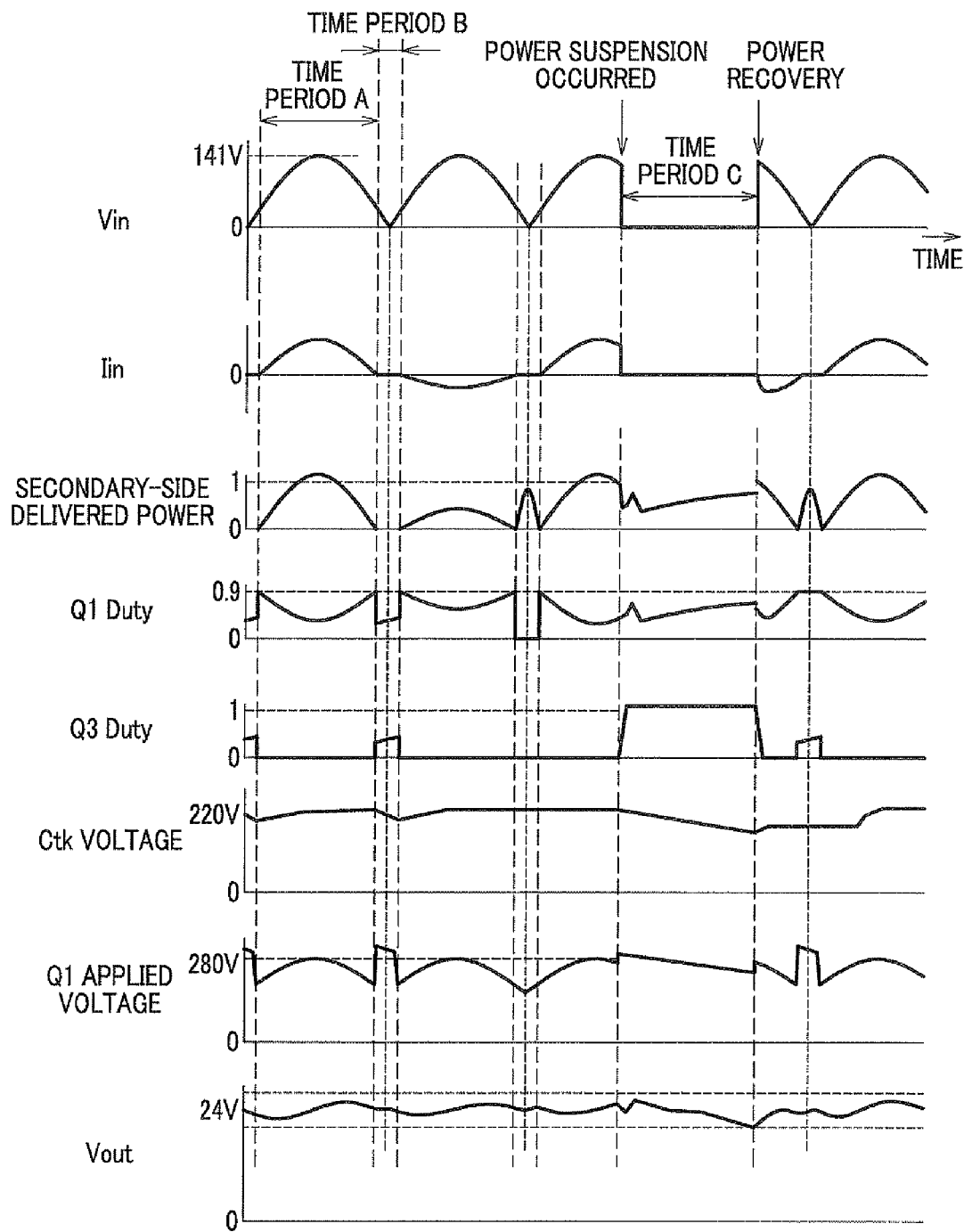
FIG. 10 is a diagram showing respective waveforms of the switching power supply of the first embodiment of the present invention before and after power is suspended.

FIG. 10 is a diagram showing respective waveforms of the switching power supply before and after a power suspension according to the first embodiment.

In FIG. 10, together with the occurrence of a power suspension, the input voltage waveform Vac and the input current Iin become 0, the switching device Q3 is turned on, and the energy is supplied from the instant power-suspension compensating capacitor Ctk. Accordingly, the Ctk voltage (the voltage of the instant power-suspension compensating capacitor Ctk) gradually drops and the output voltage Vout also gradually drops, but power is kept to be supplied to the load 12 (see FIG. 1).

Also, together with a recovery from the power suspension, the operation returns to a normal operation (the time periods A and B, see FIGS. 4 and 10).

Second Embodiment

Next, an explanation will be given of a second embodiment with reference to FIG. 11.

Figure 11:
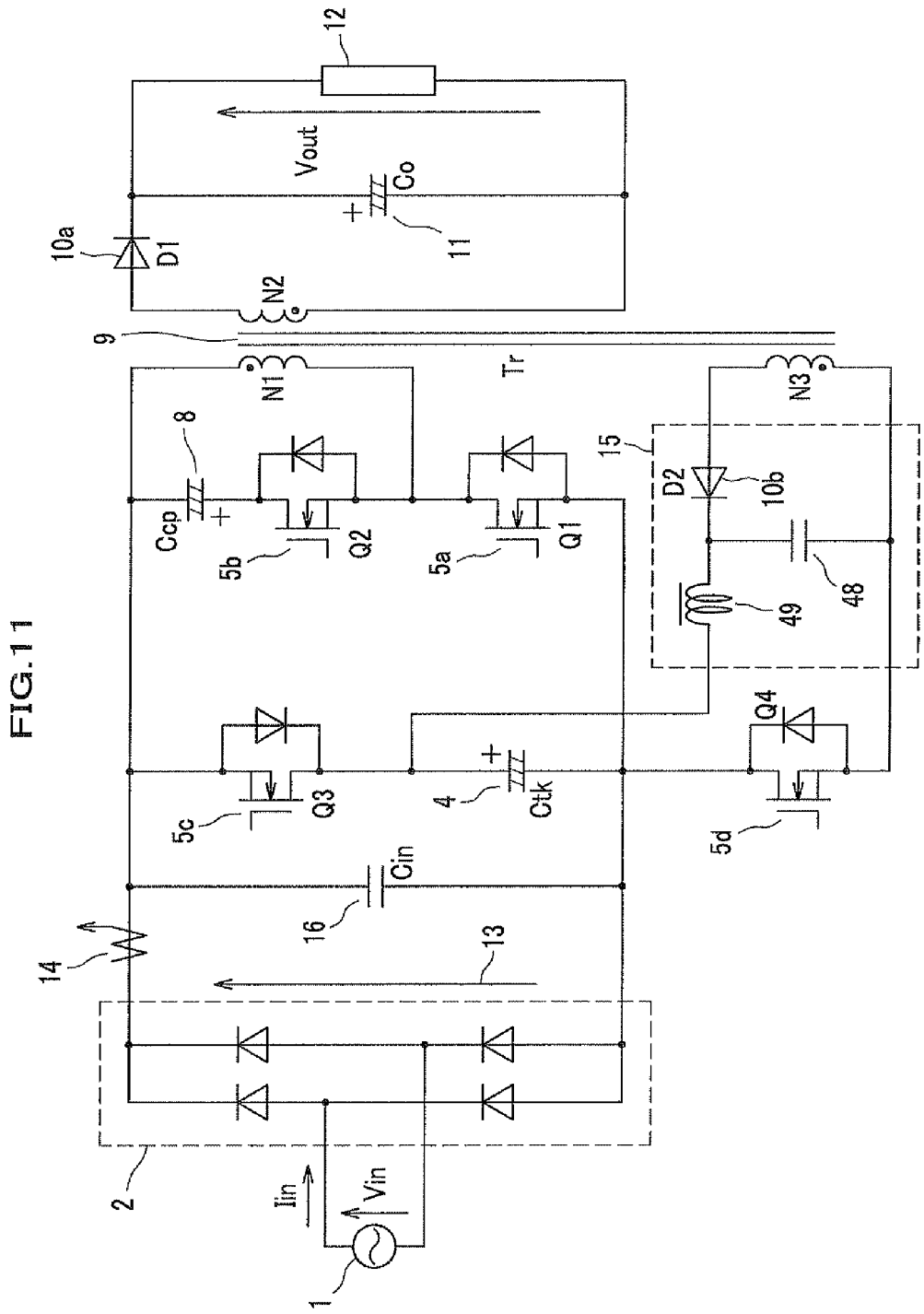
FIG. 11 is a diagram showing a configuration of a charging circuit in a switching power supply according to a second embodiment of the present invention.

FIG. 11 shows a specific circuit configuration of the charging circuit 15 shown in FIG. 1 in more detail as an embodiment.

The anode of a diode 10*b* (D2) is connected to the end (an opposite side of the black dot) of the third winding N3 of the insulation transformer 9, and a capacitor 48 is connected between the cathode of the diode 10*b* and the beginning (the black dot) of the secondary winding N2. The diode 10*b* has the cathode connected to the positive terminal of the instant power-suspension compensating capacitor 4 through a coil 49, and the negative terminal is connected to the negative terminal of the instant power-suspension compensating capacitor 4 through the power MOSFET 5*d* (the switching device Q4).

The power MOSFET 5*d* is an N-type (N-channel) device, has the drain connected to the negative terminal of the instant power-suspension compensating capacitor 4, and the source connected to the beginning (the black dot in FIG. 11) of the third winding N3.

An induced current generated at the output terminal of the third winding N3 depending on the turn ratio of the transformer has a current direction defined by the diode 10*b*, and the capacitor 48 is charged with the same polarity as that of the instant power-suspension compensating capacitor 4. Also, the power MOSFET 5*d* controls the energy (power) stored in the capacitor 48, so that the instant power-suspension compensating capacitor 4 can be charged up to a set value in a boosted manner.

The coil 49 is for suppressing a sudden generation of an excessive charging current when the potential difference is large between the capacitor 48 and the instant power-suspension compensating capacitor 4, and has an inductance of several μH to several ten μH.

Like the diode 10*a* at the secondary side, the diode 10*b* blocks a current from the third winding N3 when the switching device Q1 (the power MOSFET 5*a*) is turned on to excite the transformer.

The positive terminal of the capacitor 48 and the positive terminal of the instant power-suspension compensating capacitor 4 of the primary circuit are connected together via the coil 49 so that the charging current does not become excessive. The capacitor 48 has the negative terminal connected to the switching device Q4 (the power MOSFET 5*d*), and by controlling the switching device Q4, the operation of the charging device 15 can be controlled.

The circuit configuration shown in FIG. 11 is same as that of FIG. 1 other than the configuration of the charging circuit 15, so that explanation for portions other than the charging circuit 15 will be omitted.

Third Embodiment

An explanation will be given of a third embodiment of the present invention with reference to FIGS. 12A to 12C.

Figure 12A:
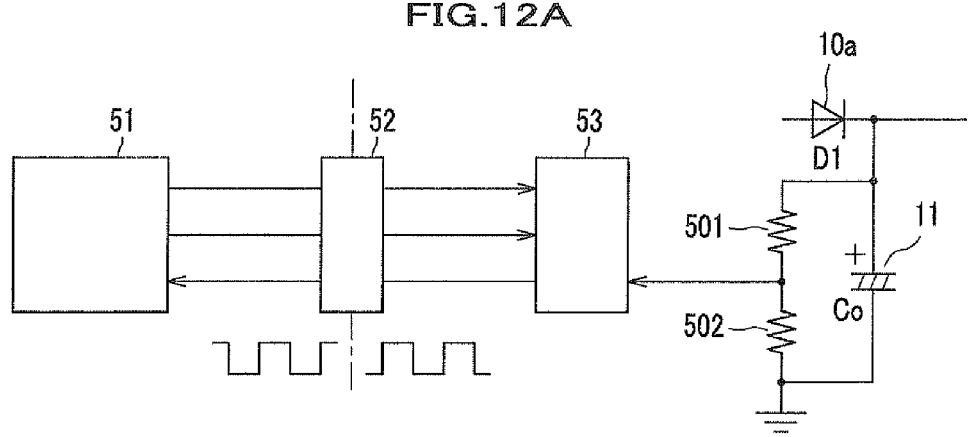
FIGS. 12A to 12C are diagrams showing a configuration of an output voltage detector in a switching power supply according to a third embodiment of the present invention, and respectively showing three different kinds of such configurations.
Figure 12B:
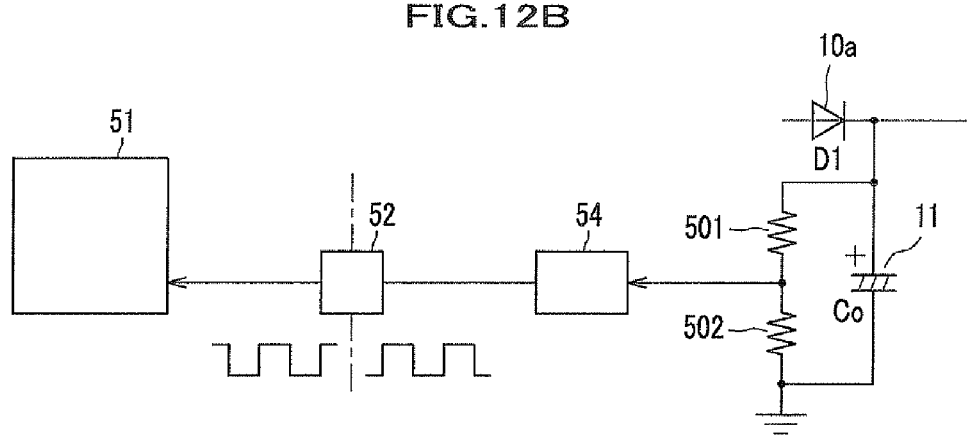
Figure 12C:
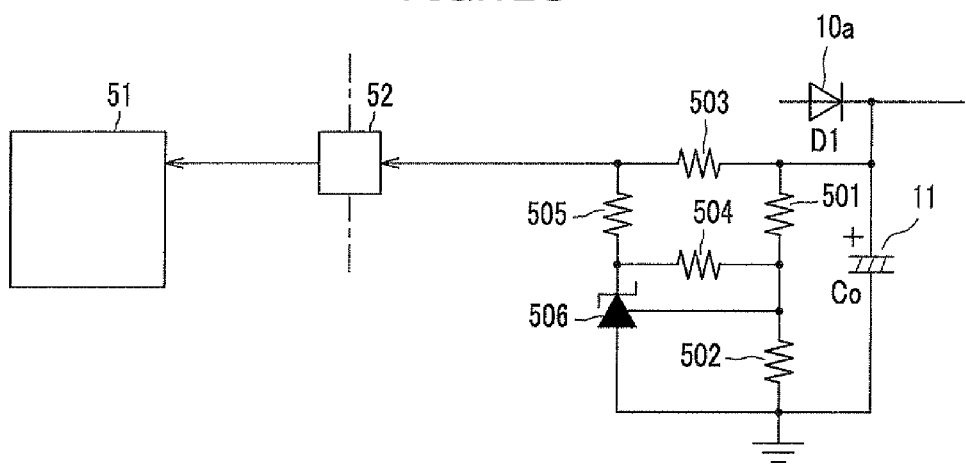

FIGS. 12A to 12C are diagrams showing a configuration of an output voltage detector in a switching power supply according to the third embodiment. FIGS. 12A, 12B, and 12C show three different kinds of configurations of an output voltage detector, and respective configurations will be referred to as a third embodiment A, a third embodiment B, and a third embodiment C.

According to the present invention, as explained in the first embodiment, as necessary values for a control, an input voltage, an input current, an output voltage, and a voltage of the instant power-suspension compensating capacitor are obtained, and a feedback control is performed in accordance with respective values. Among the four obtained values, the first three values are located at the primary side as same as the controller, but the output voltage is located at the second side via an insulation, so that how to obtain such a value is a technical issue.

Third Embodiment A

FIG. 12A shows a simplest configuration as a function of the output voltage detector. That is, at the secondary side of the insulation transformer 9 (see FIG. 1), an output voltage (a voltage across both terminals of the output smoothing capacitor 11) is divided by a resistor 501 and a resistor 502, input into an ADC (Analog to Digital Converter, an A/D converter IC) 53 and is converted into a digital signal with pulse strings, and such a digital signal is transmitted to the primary side of the insulation transformer 9 (see FIG. 1) by a photocoupler 52, thereby causing the controller 51 to receive the signal.

In this case, in general, in order to transmit at least a clock signal and a control signal CS for a control to the ADC, and to receive a result as a serial signal, fast-speed photocouplers by what corresponds to at least three channels are necessary.

The reason why the photocoupler 52 is used is to insulate between the primary side and the secondary side in order to obtain a DC isolation.

Third Embodiment B

FIG. 12B shows a configuration of the output voltage detector that uses a timer IC 54 which outputs a PWM signal as a simpler configuration.

The cycle of the timer IC 54 can be set based on a resistance and a capacitance, so that an input voltage obtained by dividing an output voltage by the resistor 501 and the resistor 502 is output as an arbitrary PWM signal. Such a PWM signal is transmitted to the primary side of the transformer 9 (see FIG. 1) by the photocoupler 52, and the controller IC 51 counts the pulse width, thereby converting the signal into a digital value. Since it is a non-synchronous signal, a device is necessary at the control IC (controller 51) side, but the timer IC 54 can be obtained inexpensively in comparison with the ADC 53, and the photocoupler 52 by what corresponds to one channel is merely necessary, so that the cost can be remarkably reduced in comparison with the configuration shown in FIG. 12A.

Third Embodiment C

FIG. 12C shows a configuration of the output voltage detector that uses a shunt regulator 506 which is nowadays used in a general analog control power supply. The output voltage is divided by the resistor 501 and the resistor 502, and the photocoupler 52 is driven by the output by the shunt regulator 506 together with resistors 503 to 505, the output changes depending on driving force, which is transmitted to the primary side as an analog voltage that changes around a set value. When such an analog voltage is received by the controller IC (a microcomputer) 51 having, for example, an ADC terminal, a detecting system more inexpensive can be realized.

Fourth Embodiment

Next, an explanation will be given of a fourth embodiment of the present invention with reference to FIGS. 13 and 14.

Figure 13:
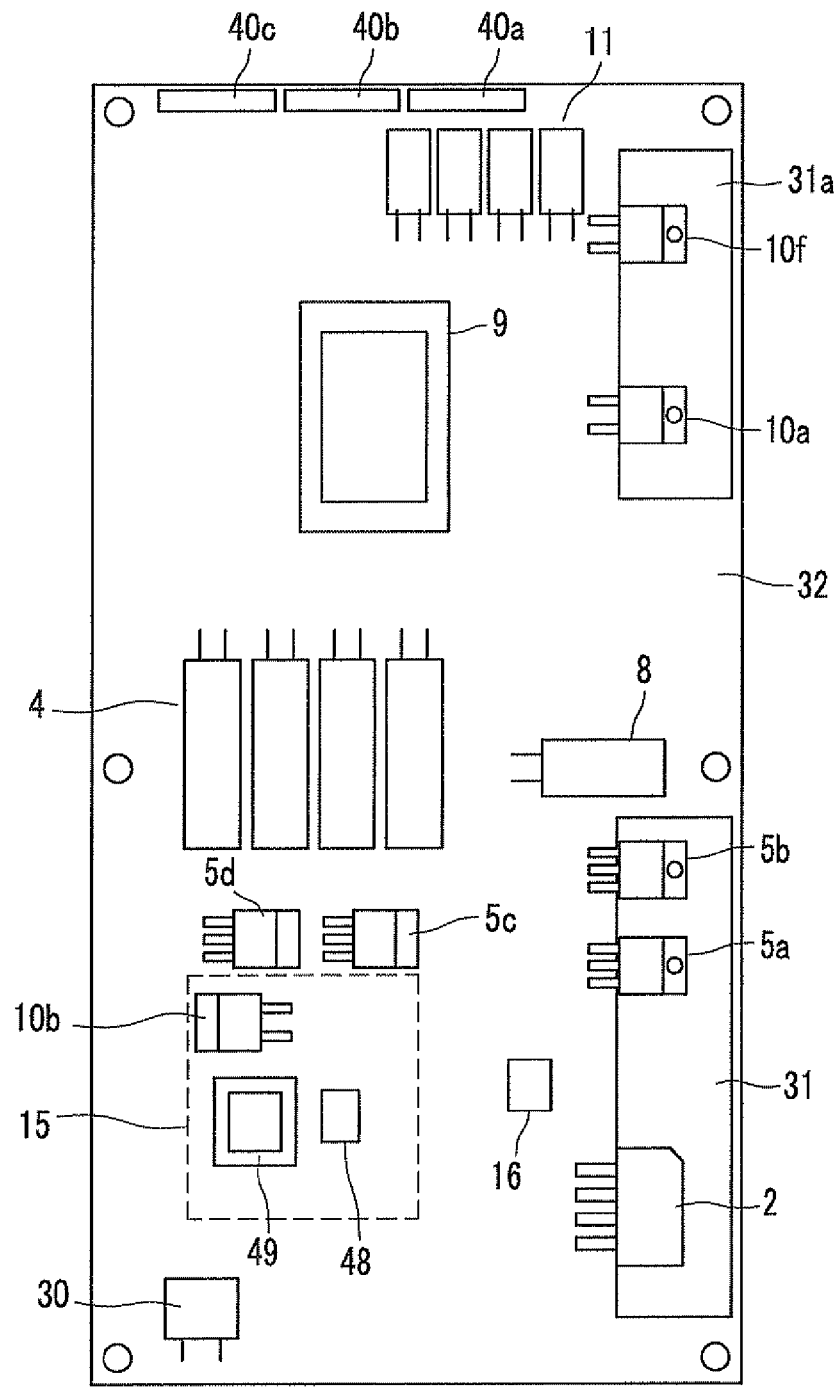
FIG. 13 is a diagram showing a substrate of a switching power supply according to a fourth embodiment of the present invention.

FIG. 13 is a diagram showing a substrate of a switching power supply of the fourth embodiment as viewed from the above. This substrate basically has the same circuit configuration as that of the circuit diagram of FIG. 11.

In FIG. 13, the same structural element as that of the circuit diagram of FIG. 1 is denoted by the same reference numeral. However, components that are not included in FIG. 1 are shown.

Also, FIG. 14 shows a configuration in which the substrate shown in FIG. 13 is mounted in a thin-screen television. In FIG. 14, a power supply substrate 32 is mounted in a plane-to-plane manner, and is mounted in such a way that the upper side of the figure becomes the upper side of a panel.

In FIG. 13, an input connector 30 is provided at the lower part of the power supply substrate 32, and the diode bridge 2, the charging circuit 15, the power MOSFETs 5a, 5b, 5c, and 5d (the switching devices Q1, Q2, Q3 and Q4), the diode 10b (D2), and the capacitor 16 are laid out near the input connector 30. Among those components, the diode bridge 2 and the power MOSFETs 5a and 5b which are heat generating components are mounted on an aluminum plate 31 with a thickness of 1 to 2 mm for heat dissipation. The power MOSFETs 5c and 5d (the switching devices Q3 and Q4) and the diode 10b (D2) which hardly generate heat are directly mounted on the substrate.

Several pieces of the capacitor 4 are arranged side by side in the vicinity of the center of the power supply substrate 32. Also, the capacitor 8 is mounted. The transformer 9 is mounted at the upper part of the substrate where the capacitors are mounted. In the power supply substrate 32, the upper part of the transformer 9 is the secondary side, and diodes 10a and 10f are mounted on this area. Those diodes are attached to an aluminum plate 31a different from the aluminum plate 31 and are mounted on the power supply substrate 32. Several pieces of the output smoothing capacitor 11 are arranged side by side in the vicinity of the diodes 10a and 10f. Output connectors 40a, 40b, and 40c are mounted at the uppermost edge of the substrate. Also, the charging circuit 15 configured by the diode 10b (D2), the capacitor 48, and the coil 49 is mounted.

By employing the highly effective circuit configuration of the present invention and the capacitors divided into thin pieces and mounted, the total thickness of the power supply substrate 32 can be reduced.

Next, an explanation will be given of FIG. 14. FIG. 14 shows a thin-screen liquid crystal television set as viewed from the back, as viewed from the above, and as viewed from the side, at the center, the bottom, and the right of the figure, respectively.

In the figure as viewed from the back, the back cover of the set is detached, and the power supply substrate 32 is mounted between a support poles 34b and 34c located at the center and the right.

The panel is connected to a power supply cable 38, and is also connected to a filter substrate 39 mounted below the power supply substrate 32. An output cable from the filter substrate 39 is connected to the input connector 30 (see FIG. 13) of the power supply substrate 32.

The output connectors 40a, 40b, and 40c (see FIG. 13) of the power supply substrate 32 are connected to an LED driver substrate 35b, an LED driver substrate 35a, and a circuit substrate 36. The LED driver substrates 35b and 35a each have an unillustrated converter into which voltage of 24 V output by the power supply substrate 32 of the switching power supply is input, and which boosts or bucks such a voltage to a voltage necessary for an unillustrated LED backlight to turn on. By controlling a current flowing through the LED, the brightness of the LED can be controlled. The unillustrated LED backlight is located between the power supply substrate 32, the circuit substrate 36, etc., and a liquid crystal panel 33, and has a thickness of 10 mm or so.

Regarding a T-con (timing controller) substrate 37, a power input into the circuit substrate 36 is converted into a necessary voltage by the circuit substrate and is supplied to the T-con substrate 37.

Also, as shown in FIG. 14, by mounting the switching power supply substrate 32 with a thickness of less than 10 mm on an unillustrated television device with the liquid crystal panel 33 or on the back of the panel part of an unillustrated image monitor device, and by employing an unillustrated LED backlight with a thickness of 10 to 20 mm driven by the LED driver, the set thickness of the unillustrated panel part can be thinned to be equal to or greater than 20 mm and equal to or less than 30 mm.

Other Embodiments

In the first embodiment of the present invention, the switching device that is a power MOSFET is used, but an IGBT (Insulated Gate Bipolar Transistor) may be used depending on conditions, such as a current capacity and a voltage. Also, power devices including a diode and formed of SiC (silicon carbide) are appropriate.

The explanation was given of a case in which the power MOSFET is an N-channel type, but a P-channel switching device may be used depending on an application.

In the first embodiment, an analog circuit configuration for controlling of the switching power supply was explained, but it may be a digital control. In the case of the digital control, various control algorithm can be employed.

A source of power was commercially available AC, but the present invention is not limited to the commercially available AC, and in-house power generation may be adopted. The present invention can be applied to a typical case in which AC power is used as a source.

Specific examples and values of a power supply voltage, and of a voltage applied to each device in the display device and the mount substrate were explained but those are the matters of design, and by applying the present invention under conditions with different voltages and shapes, a switching power supply can be downsized, which contributes to downsizing, weight saving and thinning of a device provided with the switching power supply.

Although the thin-screen television set provided with the switching power supply of the embodiment of the present invention was explained with reference to FIGS. 13 and 14, it is just an example, and by applying the switching power supply of the embodiment of the present invention, various devices can be downsized, light-weighted and thinned.

Complement for Present Invention and Embodiment

Below is a brief summary of the embodiment. An insulation type switching power supply with a single stage configuration has a function of improving a power factor, and performs two kinds of controls for switching devices exclusive to each other: controlling of a switching device provided in a direction in which the discharging of the primary-side smoothing capacitor is prohibited at the time of suspension of commercially available AC power and near the zero cross of an input voltage; and providing the charging circuit, and causing the switching device provided between the output side of the third winding and the primary-side smoothing capacitor to control a charging current, thereby charging the instant power-suspension compensating capacitor in a boosted manner.

According to such technologies, the applied voltage and the inrush current of the switching device can be reduced, the fluctuation of an output voltage and the switching loss can be suppressed, and the power supply efficiency is improved. Also, respective capacitances of the instant power-suspension compensating capacitor and the output capacitor can be designed to be minimum so that the volume can be reduced and an initial charging circuit can be eliminated, thereby reducing the mount volume of the switching power supply.

As explained above, the thickness of the power supply can be reduced to equal to or less than 10 mm, and the set thickness of the display device like a liquid crystal television or a plasma television provided with that power supply can be reduced to equal to or less than 30 mm.

The present invention can be applied to any kinds of electric apparatuses, air conditioners, home electronics, and information devices, such as a personal computer and a server, to which commercially available AC power is input in order to operate.

What is claimed is:

1. A switching power supply into which AC power is input and which outputs DC power electrically insulated from the AC power, the switching power supply comprising:
    a first rectification-smoothing unit that rectifies and smooths the AC power;
    an insulation transformer that includes at least a primary winding, a secondary winding, and a third winding;
    a second rectification-smoothing unit which is connected to the secondary winding, rectifies and smooths AC power from the secondary winding and outputs DC power;
    a first switching device that is connected between a DC-side terminal of the first rectification-smoothing unit and the primary winding;
    an inrush current suppressing unit which is connected to the primary winding in parallel therewith and which includes a second switching device;
    a charge storing unit that is connected to a DC side of the first rectification-smoothing unit;
    a third switching device that is connected in series to the DC side of the first rectification-smoothing unit so as to prevent the charge storing unit from discharging;
    a charging circuit that charges the charge storing unit with power from the third winding in a boosted manner;
    a fourth switching device which is connected between the charging circuit and the charge storing unit and which controls a charging current of the charging circuit;
    a power factor improving control unit which controls the first, second, third and fourth switching devices and which improves a power factor of the AC power to be input; and
    a power-suspension detecting unit that detects a power suspension of the AC power,
    the third switching device being controlled when the power-suspension detecting unit detects a power suspension of the AC power in order to cause the charge storing unit that stores a charge in advance to discharge the insulated DC power to an output side through the insulation transformer.

2. The switching power supply according to claim 1, wherein the charging circuit includes:
    a diode connected to an input side from the third winding;
    a capacitor connected to the diode and the third winding in parallel with the diode and the third winding; and
    a coil connected to a charging path from the capacitor to the charge storing unit.

3. The switching power supply according to claim 2, wherein
    when the power-suspension detecting unit determines that an input voltage of the commercially available AC power is high, the third switching device is controlled so as to halt an operation thereof, and the fourth switching device is controlled so as to charge the charge storing unit until a hold voltage thereof becomes a predetermined set value, and
    when the power-suspension detecting unit determines that the input voltage of the commercially available AC power is low, the fourth switching device is controlled so as to halt an operation thereof, and the third switching device is controlled in order to cause the charge storing unit storing a charge in advance to discharge, thereby discharging and outputting the insulated DC power to an output side through the insulation transformer and the second rectification-smoothing unit.

4. A display unit comprising the switching device according to claim 3 as a power converting device.

5. A display device comprising the switching device according to claim 2 as a power converting device.

6. The switching power supply according to claim 1, wherein
    when the power-suspension detecting unit determines that an input voltage of the commercially available AC power is high, the third switching device is controlled so as to halt an operation thereof, and the fourth switching device is controlled so as to charge the charge storing unit until a hold voltage thereof becomes a predetermined set value, and when the power-suspension detecting unit determines that the input voltage of the commercially available AC power is low, the fourth switching device is controlled so as to halt an operation thereof, and the third switching device is controlled in order to cause the charge storing unit storing a charge in advance to discharge, thereby discharging and outputting the insulated DC power to an output side through the insulation transformer and the second rectification-smoothing unit.

7. A display device comprising the switching device according to claim 6 as a power converting device.

8. A display device comprising the switching device according to claim 1 as a power converting device.

* * * * *